US012038081B2

United States Patent
Barrientos Blanco

(10) Patent No.: US 12,038,081 B2
(45) Date of Patent: Jul. 16, 2024

(54) COMPOSITE TRANSMISSION HOUSING

(71) Applicants: Ningbo Geely Automobile Research & Development Co., Ltd., Ningbo (CN); Zhejiang Geely Holding Group Co., Ltd., Zhejiang (CN)

(72) Inventor: Eva Barrientos Blanco, Gothenburg (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/138,109

(22) Filed: Apr. 23, 2023

(65) Prior Publication Data
US 2023/0258258 A1  Aug. 17, 2023

Related U.S. Application Data

(63) Continuation of application No. PCT/CN2021/131492, filed on Nov. 18, 2021.

(30) Foreign Application Priority Data

Nov. 23, 2020 (EP) .................................. 20209250

(51) Int. Cl.
*F16H 57/032* (2012.01)
*F16H 57/029* (2012.01)
(Continued)

(52) U.S. Cl.
CPC ......... *F16H 57/032* (2013.01); *F16H 57/029* (2013.01); *F16H 57/031* (2013.01);
(Continued)

(58) Field of Classification Search
CPC .... F16H 57/029; F16H 57/031; F16H 57/032; F16H 2057/02043; F16H 2057/02091; F16H 2057/0325
See application file for complete search history.

(56) References Cited

U.S. PATENT DOCUMENTS 954,038 A * 4/1910 Mason ...................... F16P 1/02
74/609
4,004,472 A * 1/1977 Millward ................ F16H 48/08
475/247
(Continued)

FOREIGN PATENT DOCUMENTS

| CN | 106989163 A | 7/2017 |
|----|-------------|--------|
| CN | 108506455 A | 9/2018 |

(Continued)

OTHER PUBLICATIONS

International Search Report from corresponding International Application No. PCT/CN2021/131492, mailed on Feb. 15, 2022, 2 pages.
(Continued)

*Primary Examiner* — Thomas C Diaz
(74) *Attorney, Agent, or Firm* — Tucker Ellis LLP

(57) ABSTRACT

A composite transmission housing for a vehicle drive train transmission is configured for sealingly enclosing transmission shafts, gearwheels, and a lubricant fluid within an internal space of the housing and includes: a first carbon-fibre skeleton part having a first attachment region; a second carbon-fibre skeleton part having a first attachment region; a first sealing cover part made of plastic material and having a first sealing surface; and a second sealing cover part made of plastic material and having a second sealing surface. The first attachment regions of the first and second carbon-fibre skeleton parts are mutually connected for providing a rigid structural framework that defines said internal space, and the first and second sealing surfaces of the first and second
(Continued)

sealing cover parts are pressed together or against corresponding sealing surfaces associated with the first and second carbon-fibre skeleton parts, for providing a sealing envelope around said internal space.

15 Claims, 13 Drawing Sheets

(51) Int. Cl.
    *F16H 57/031*     (2012.01)
    *F16H 57/02*     (2012.01)

(52) U.S. Cl.
    CPC ............ *F16H 2057/02043* (2013.01); *F16H 2057/02091* (2013.01); *F16H 2057/0325* (2013.01)

(56) References Cited

U.S. PATENT DOCUMENTS

| | | | |
|---|---|---|---|
| 4,122,730 A * | 10/1978 | Weiland | F16H 57/032 |
| | | | 74/606 R |
| 10,024,418 B2 * | 7/2018 | Mizoguchi | F16H 48/40 |
| 10,465,789 B2 * | 11/2019 | Uesugi | F16H 57/04 |
| 11,359,713 B2 * | 6/2022 | Bronner | F16H 57/0424 |
| 11,713,803 B1 * | 8/2023 | Coppola | H02K 5/02 |
| | | | 74/606 R |
| 2005/0097984 A1 | 5/2005 | Davis | |
| 2016/0003344 A1 | 1/2016 | Mapkar | |
| 2017/0307008 A1 | 10/2017 | Heege | |
| 2018/0178909 A1 | 6/2018 | Sola | |
| 2018/0245681 A1 | 8/2018 | Newcomb | |
| 2020/0124160 A1 | 4/2020 | Jumper | |

FOREIGN PATENT DOCUMENTS

| | | |
|---|---|---|
| CN | 208951052 U | 6/2019 |
| CN | 210034343 U | 2/2020 |
| EP | 0928713 A2 | 7/1999 |
| FR | 2345634 A1 | 10/1977 |
| GB | 2561804 A | 10/2018 |
| JP | 2008137600 A | 6/2008 |
| WO | 0164570 A1 | 9/2001 |
| WO | 12000670 A2 | 1/2012 |
| WO | 18162595 A1 | 9/2018 |

OTHER PUBLICATIONS

Sherman, Lilli, "First Thermoplastic Composite Gearbox Housing: 30% Lighter Than Aluminum", Aug. 18, 2017, 15 pages.

* cited by examiner

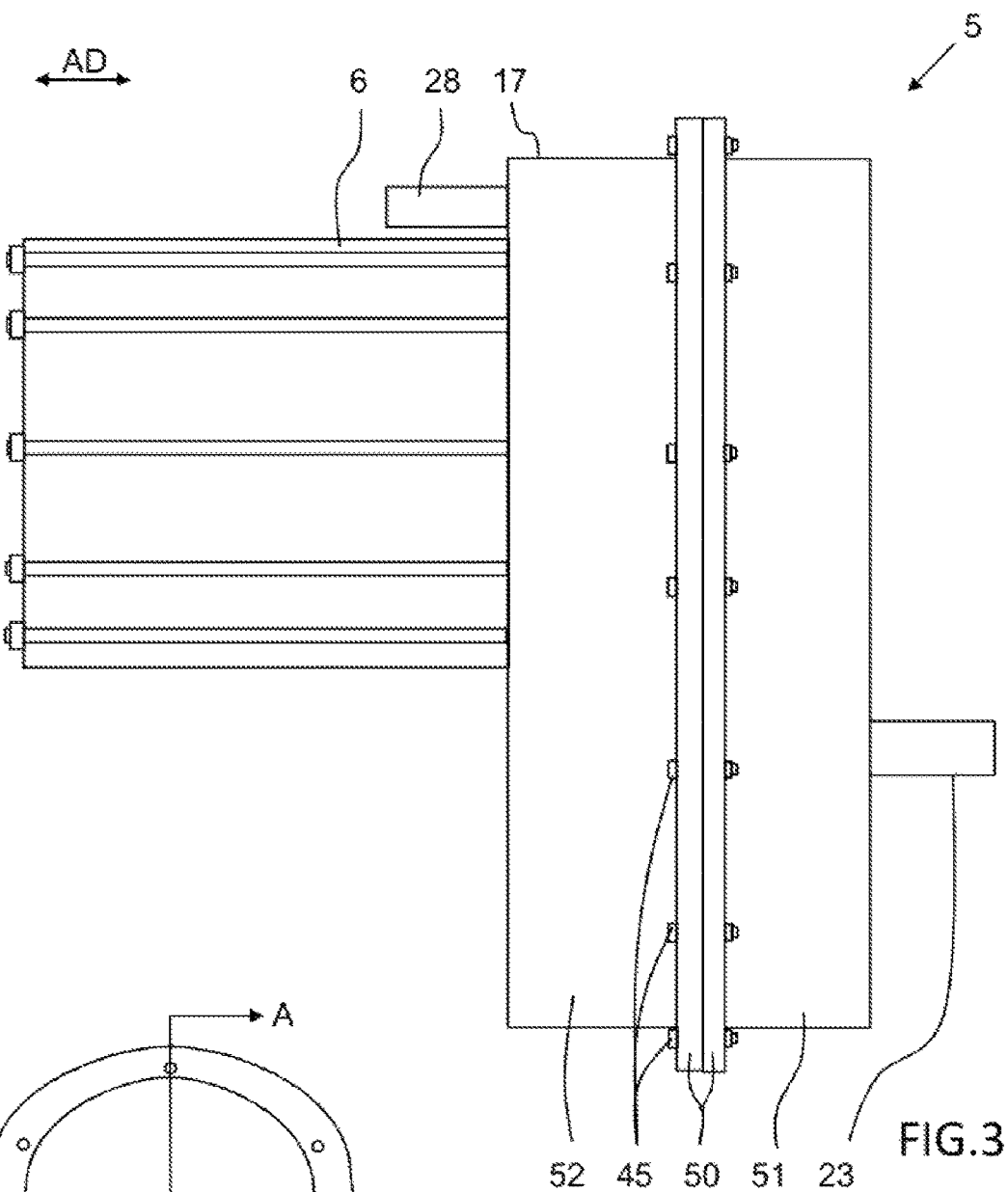
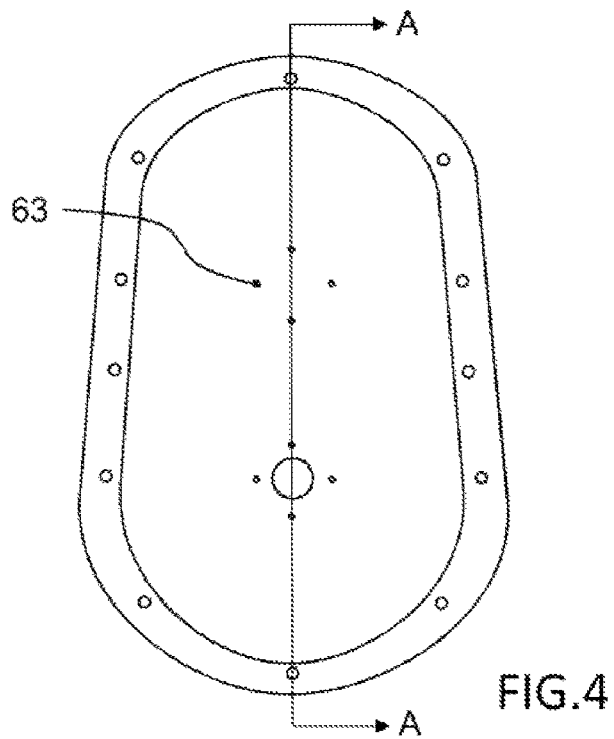

A-A

B-B

C-C

D-D

E-E

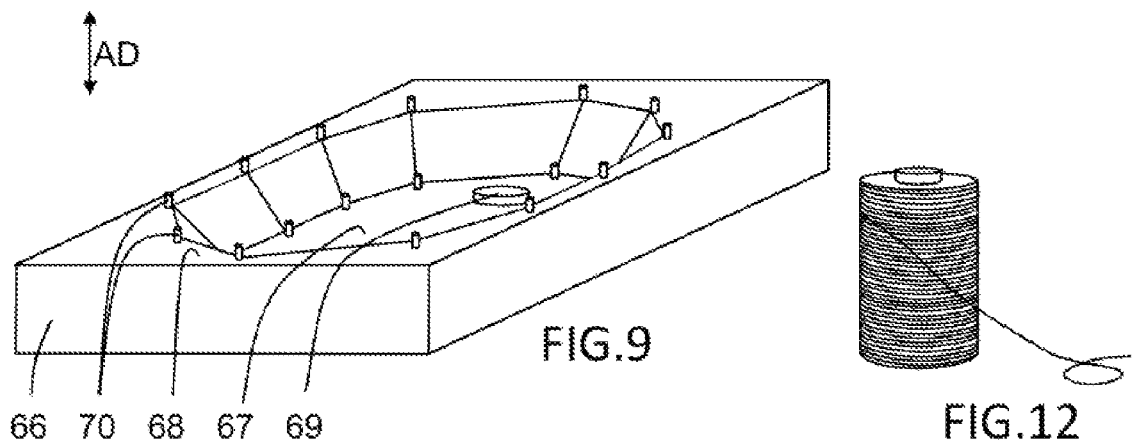
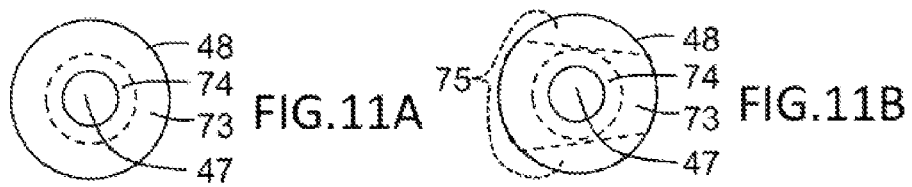
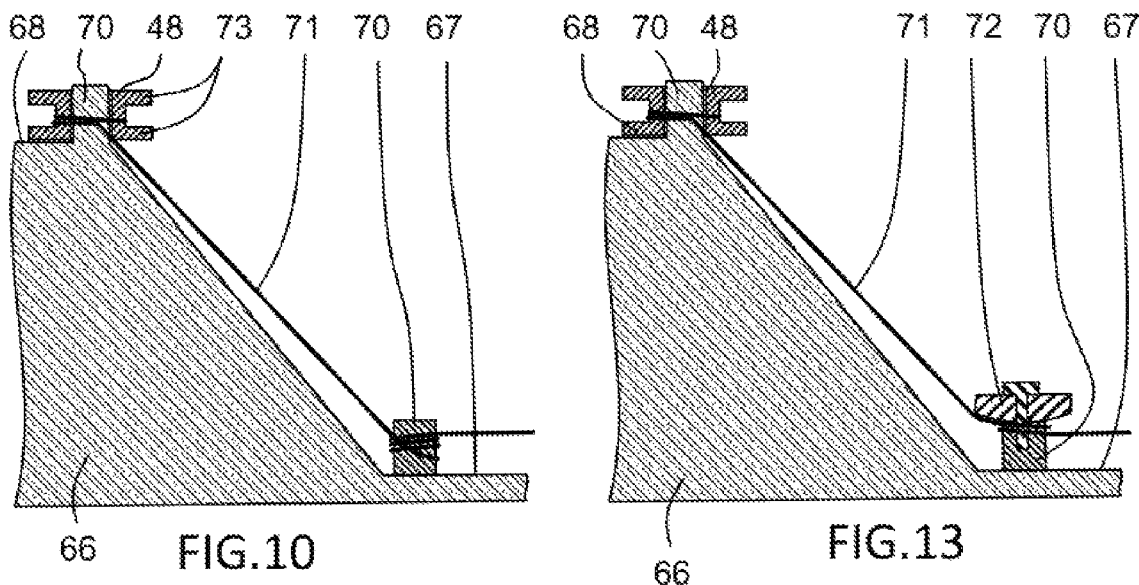
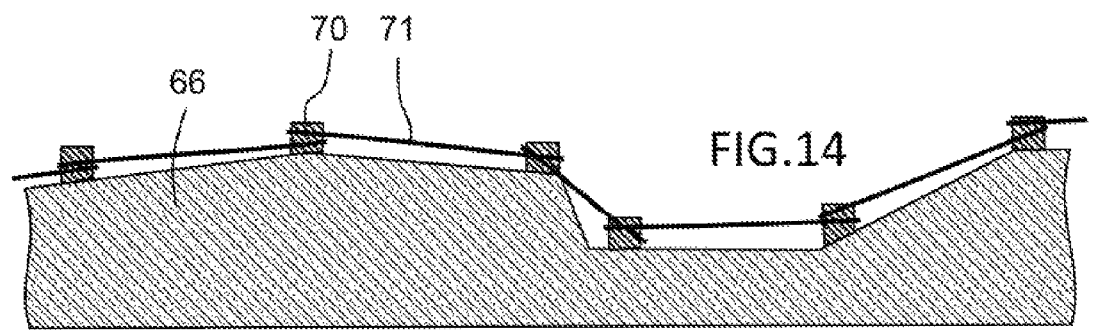

F-F

G-G

H-H

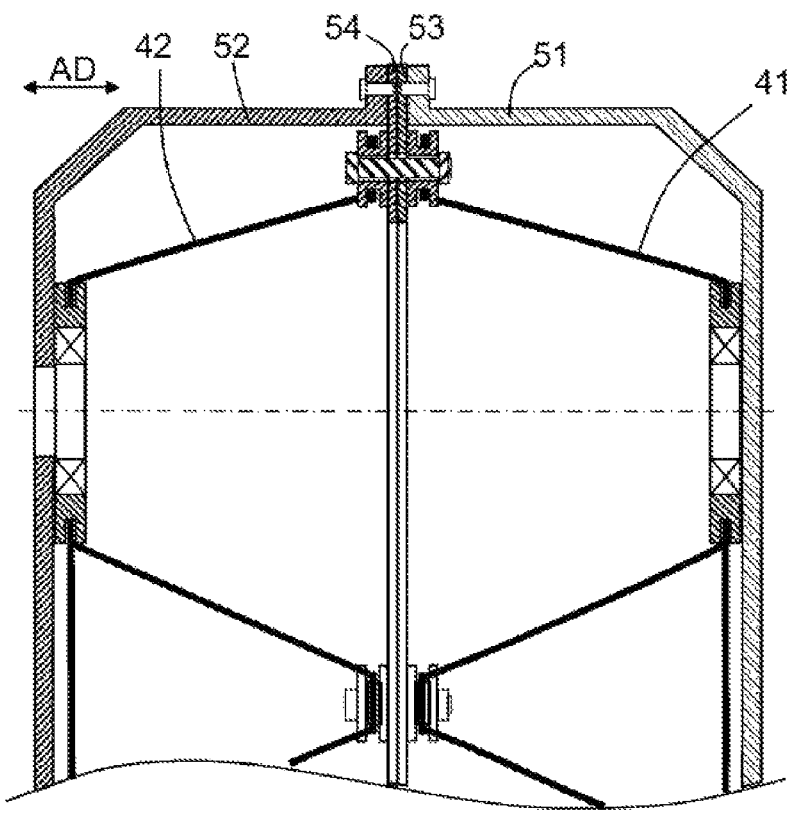
FIG.23
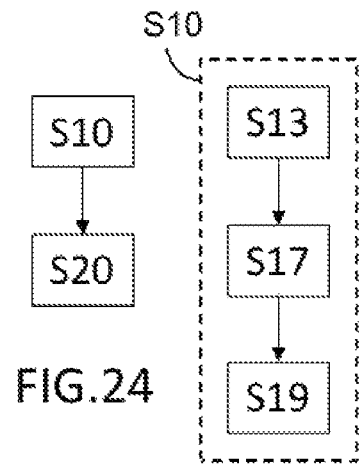
FIG.24
FIG.25
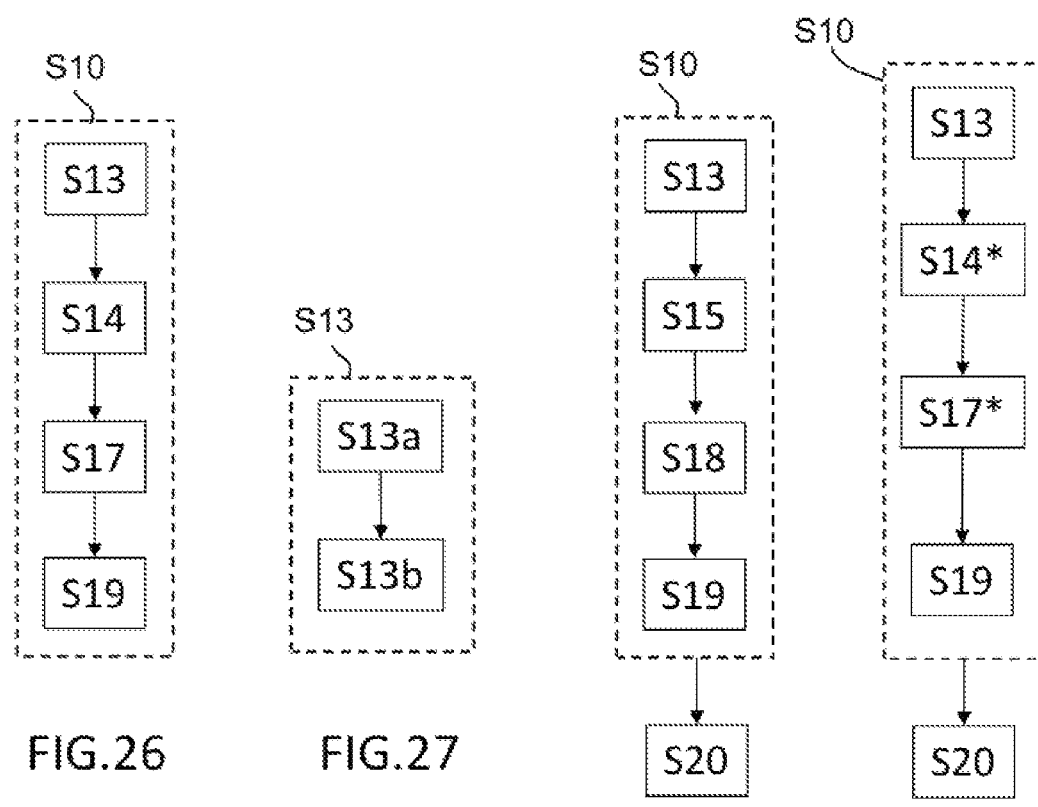
FIG.26  FIG.27  FIG.28  FIG.29

COMPOSITE TRANSMISSION HOUSING

RELATED APPLICATION DATA

This application is a continuation of International Patent Application No. PCT/CN2021/131492, filed Nov. 18, 2021, which claims the benefit of European Patent Application No. 20209250.8, filed Nov. 23, 2020, the disclosures of which are incorporated herein by reference in their entireties.

TECHNICAL FIELD

The present disclosure relates to a composite transmission housing for a vehicle drive train transmission, as well as to a method for manufacturing such as composite transmission housing. The transmission housing may for example include a multi-speed transmission, a single-speed transmission, a continuously variable speed transmission, a differential gear transmission, or the like.

The composite transmission housing according to the disclosure will be described primarily in relation to a car, but the transmission housing is not restricted to this particular vehicle, but may alternatively be installed or implemented in another type of vehicle, such as a truck, a bus, a rail vehicle, a flying vehicle, a marine vessel, a working vehicle, a motorcycle or the like.

BACKGROUND

In the field of vehicle engineering there is demand for further improved weight reduction because reduced weight generally results in improved fuel or energy efficiency and improved vehicle driving performance. It is known from for example document US 2018/0245681 A1 to provide a transmission housing with polymeric composite body and reinforcing fibres instead of conventional metal material for the purpose of weight reduction.

However, despite the activities in the field, there is still a demand for further improved transmission housings in terms of low weight, high strength and low thermal expansion.

SUMMARY

An object of the present disclosure is to provide a composite transmission housing for a vehicle drive train transmission, and corresponding method for manufacturing, where the previously mentioned aspects, such as low weight, high strength and low thermal expansion, are further improved. This object is at least partly achieved by the features of the independent claims.

According to a first aspect of the present disclosure, there is provided a composite transmission housing for a vehicle drive train transmission. The transmission housing is configured for sealingly enclosing a set of transmission shafts and gearwheels and a lubricant fluid within an internal space of the housing. The housing comprises: a first carbon-fibre skeleton part having a first attachment region; a second carbon-fibre skeleton part having a first attachment region; a first sealing cover part made of plastic material and having a first sealing surface; and a second sealing cover part made of plastic material and having a second sealing surface. The first attachment regions of the first and second carbon-fibre skeleton parts are mutually connected for providing a rigid structural framework that defines said internal space. Furthermore, the first and second sealing surfaces of the first and second sealing cover parts are pressed together or against corresponding sealing surfaces associated with the first and second carbon-fibre skeleton parts, for providing a sealing envelope around said internal space.

According to a second aspect of the present disclosure, there is provided a method for manufacturing a composite transmission housing for a vehicle drive train transmission. The transmission housing is configured for sealingly enclosing a set of transmission shafts and gearwheels and a lubricant fluid within an internal space of the housing. The method comprising: manufacturing a first carbon-fibre skeleton part having a first attachment region, a second carbon-fibre skeleton part having a first attachment region, a first sealing cover part made of plastic material and having a first sealing surface, and a second sealing cover part made of plastic material and having a second sealing surface; and assembling the first and second carbon-fibre skeleton parts and first and second sealing cover parts, such that the first attachment regions of the first and second carbon-fibre skeleton parts become mutually connected and defining a rigid structural framework that defines said internal space, and such that the first and second sealing surfaces of the first and second sealing cover parts are pressed together or against corresponding sealing surfaces associated with the first and second carbon-fibre skeleton parts, for providing a sealing envelope around said internal space.

In this way, a very robust and strong, but still sealed and low-weight, transmission housing is accomplished.

In particular, by dividing the housing into two main parts, namely a strong but very light-weight rigid structural framework, and a dedicated sealing cover, the benefits of each structure may be exploited. For example, manufacturing of the rigid structural framework by joining first and second carbon-fibre skeleton parts, results in a very strong and light-weight framework, while still enabling a cost-efficient and highly automated carbon fibre tow winding manufacturing process. Moreover, for enabling proper fluid lubrication of the gear within the housing, a leak-proof and low-weight sealing envelope of plastic material surrounding the gears is provided by sealingly attaching first and second sealing cover parts to the outer or inner side of the rigid framework. Moreover, by making each of the rigid structural framework and sealing envelope out of at least two parts that are joined during assembly of the transmission housing, manufacturing of each individual part of the framework and sealing envelope is simplified, because the geometry is less complicated and with less undercut features. Moreover, the design of the first and second carbon-fibre skeleton parts that form the rigid structural framework can be selected with less consideration to issues relating to assembly of the gears and shaft, because such equipment may be assembled in one part of the framework prior to mutually connecting the first and second carbon-fibre skeleton parts, if necessary.

Further advantages are achieved by implementing one or several of the features of the dependent claims.

In some example embodiments, each of the first and second carbon-fibre skeleton parts is manufactured by winding a continuous filament carbon-fibre tow along a pattern around a plurality of posts or attachment inserts of a fixture or mould, and subsequently curing the wound continuous filament carbon-fibre tow. This provides a cost-efficient manufacturing and a strong final framework structure with low level of waste material.

In some example embodiments, the position of the plurality of posts or attachment inserts of the fixture or mould and the winding pattern of the continuous filament carbon-fibre tow are selected based on stress and/or strain based topology optimization or generative design of the transmission housing. Thereby, the design may be further optimized in view of strength, rigidity while minimizing weight, materials and costs.

In some example embodiments, the first skeleton part has a first set of attachment inserts secured thereto in the first attachment region by means of continuous filament carbon-fibre being wound thereon, the second skeleton part has a second set of attachment inserts secured thereto in the first attachment region by means of continuous filament carbon-fibre being wound thereon, and the first and second carbon-fibre skeleton parts are mutually connected by fastening the first set of attachment inserts with the second set of attachment inserts. Attachment inserts provide well-defined contact surfaces and may also enable machining for obtaining high level of tolerances. Attachment inserts may also simplify detachment of the cured carbon-fibre framework from a fixture or mould.

In some example embodiments, at least one, specifically both, of the first and second carbon-fibre skeleton parts has a bearing insert secured thereto by means of continuous filament carbon-fibre being wound thereon, and wherein a bearing supporting a transmission shaft is fastened within the bearing insert. Bearing inserts provide well-defined contact surfaces and may also enable machining for obtaining high level of tolerances. Bearing inserts may also simplify detachment of the cured carbon-fibre framework from a fixture or mould.

In some example embodiments, an attachment insert and/or a bearing insert of the first and second carbon-fibre skeleton parts is provided with an internally threaded bore for attaching a sealing cover part thereto. Thereby, the risk for relative motion between the skeleton and sealing cover is reduced, thereby also reducing risk for noise, vibration and wear.

In some example embodiments, at least one of first and second carbon-fibre skeleton parts and the first and second sealing cover parts is provided with a fixture arrangement located in a space located between the rigid structural framework and the sealing envelope and configured for fixing or guiding a device installed in said space located between the rigid structural framework and the sealing envelope. Thereby, fixation, guidance, routing of devices, such as cables or pipes, within the transmission housing, is simplified, and the device is also slightly protected by means of the location between the skeleton and sealing cover part.

In some example embodiments, the first and second carbon-fibre skeleton parts and the first and second sealing cover parts are joined together by a set of common fasteners, each of which extends through and presses together all said parts. Thereby, overall fewer fasteners are required.

In some example embodiments, the first and second sealing cover parts are separate parts that are attached to first and second carbon-fibre skeleton parts, respectively, upon assembly of the composite transmission housing. Thereby, manufacturing of the sealing cover parts carbon-fibre skeleton parts are simplified.

In some example embodiments, the first and second sealing cover parts are overmoulded on an exterior or interior side of the first and second carbon-fibre skeleton parts, respectively. This allows simplified assembly of the housing because fewer individual parts must be handled and assembled.

In some example embodiments, the attachment insert and/or bearing insert has a spool-shape. This allows simple winding of the carbon-fibre tow around the insert.

In some example embodiments, the first and second sealing cover parts made of a thermoset plastic material or other similar type of low-creep plastic material. Thereby, the risk for leakage from the sealing envelope due to long term creep is reduced.

In some example embodiments, a first sealing arrangement is provided between the first and second sealing surfaces of the first and second sealing cover parts. Thereby, improved and more reliable sealing performance is accomplished.

In some example embodiments, a first sealing arrangement is provided between the first sealing surface of the first sealing cover part and a corresponding sealing surface associated with the first carbon-fibre skeleton part, and the second sealing surface of the second sealing cover part and a corresponding sealing surface associated with the second carbon-fibre skeleton part. Thereby, improved and more reliable sealing performance is accomplished.

In some example embodiments, each of the first and second carbon-fibre skeleton parts and the first and second sealing cover parts are bowl-shaped and including an interior side, an exterior side and a rim for connection or sealing with another of said parts. Thereby, a relatively large interior space for internal transmission gearing is provided.

In some example embodiments, the housing further comprises an elongated transmission shaft having an elongated extension in an axial direction of the transmission housing, and the first attachment regions are assembled together by fasteners extending in said axial direction. Thereby, a full and complete bearing support for a transmission shaft may be formed in each of the first and second carbon-fibre skeleton parts, and the bearing supports do not need to be split.

In some example embodiments, the sealing envelope formed by the first and second sealing cover parts substantially completely covers the rigid structural framework. This provides high sealing security.

In some example embodiments, the continuous filament carbon-fibre tow is made of at least 75%, specifically at least 90%, and more specifically at least 97% carbon fibre material. This provides high strength and low weight.

In some example embodiments, the continuous filament carbon-fibre tow includes a bundle of about 1000-200 000 twisted or untwisted continuous carbon filaments per tow.

In some example embodiments, the step of manufacturing the first and second carbon-fibre skeleton parts involves: providing a first fixture or mould having plurality of posts or attachment inserts, and providing a second fixture or mould having plurality of posts or attachment inserts; winding a continuous filament carbon-fibre tow along a pattern around the plurality of posts or attachment inserts of the first fixture or mould for producing a first intermediate part, and winding a continuous filament carbon-fibre tow along a pattern around the plurality of posts or attachment inserts of the second fixture or mould for producing a second intermediate part; and curing the wound continuous filament carbon-fibre tow of the first and second intermediate parts for providing the first and second rigid carbon-fibre skeleton parts. This process provides cost-efficient manufacturing.

In some example embodiments, the step of manufacturing each of the first and second carbon-fibre skeleton parts involves: mounting a first set of attachment inserts on the first fixture or mould, and mounting a second set of attachment inserts on the second fixture or mould; and winding a continuous filament carbon-fibre tow along a pattern around the first set of attachment inserts of the first fixture or mould for producing the first intermediate part, and winding a continuous filament carbon-fibre tow along a pattern around the second set of attachment inserts of the second fixture or mould for producing the second intermediate part; curing the wound continuous filament carbon-fibre tow of the first and second intermediate parts for providing the first and second rigid carbon-fibre skeleton parts; and assembling the first and second carbon-fibre skeleton parts by fastening the first set of attachment inserts with the second set of attachment inserts.

In some example embodiments, the method further comprising: determining an optimized structural design of a rigid structural framework of the transmission housing by performing a stress and/or strain-based topology optimization or generative design of the transmission housing; and based thereupon, selecting a design of the fixture or mould, selecting placement and number of posts and/or attachment inserts on the fixture or mould, and selecting the winding pattern of the continuous filament carbon-fibre tow around the plurality of posts or attachment inserts of the fixture or mould that results in a structure, in particular in terms of size, shape and/or topology, of the rigid structural framework that corresponds to the determined optimized structural design.

In some example embodiments, the step of manufacturing each of the first and second carbon-fibre skeleton parts involves: mounting at least one bearing insert on at least one of the first and second fixtures or moulds; winding a continuous filament carbon-fibre tow along a pattern around the at least one bearing insert for producing the first and/or second intermediate part; curing the wound continuous filament carbon-fibre tow of the first and second intermediate parts for providing the first and second rigid carbon-fibre skeleton parts; and installing a bearing for supporting a transmission shaft in the bearing insert.

In some example embodiments, the step of assembling the first and second carbon-fibre skeleton parts and first and second sealing cover parts include mounting a set of common fasteners, each of which extends through and presses together the first and second carbon-fibre skeleton parts and the first and second sealing cover parts, for mutually connecting the first and second carbon-fibre skeleton parts and for providing a sealing envelope around said internal space by means of the first and second sealing cover parts.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which FIGS. 3-4 show schematically two different side views of an example embodiment of the transmission housing, FIG. 9 shows schematically an example embodiment of a fixture for manufacturing the skeleton, FIGS. 10, 13 and 14 show schematically different solutions for building the carbon-fibre framework, FIGS. 11A-11B show schematically two different example embodiments of the attachment insert, FIG. 12 shows schematically a spool with carbon-fibre filament wound thereon, FIGS. 22-23 show two further example embodiments of the composite transmission housing, and FIGS. 24-29 show the basic steps of some alternative embodiments of a method for manufacturing the composite transmission housing.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
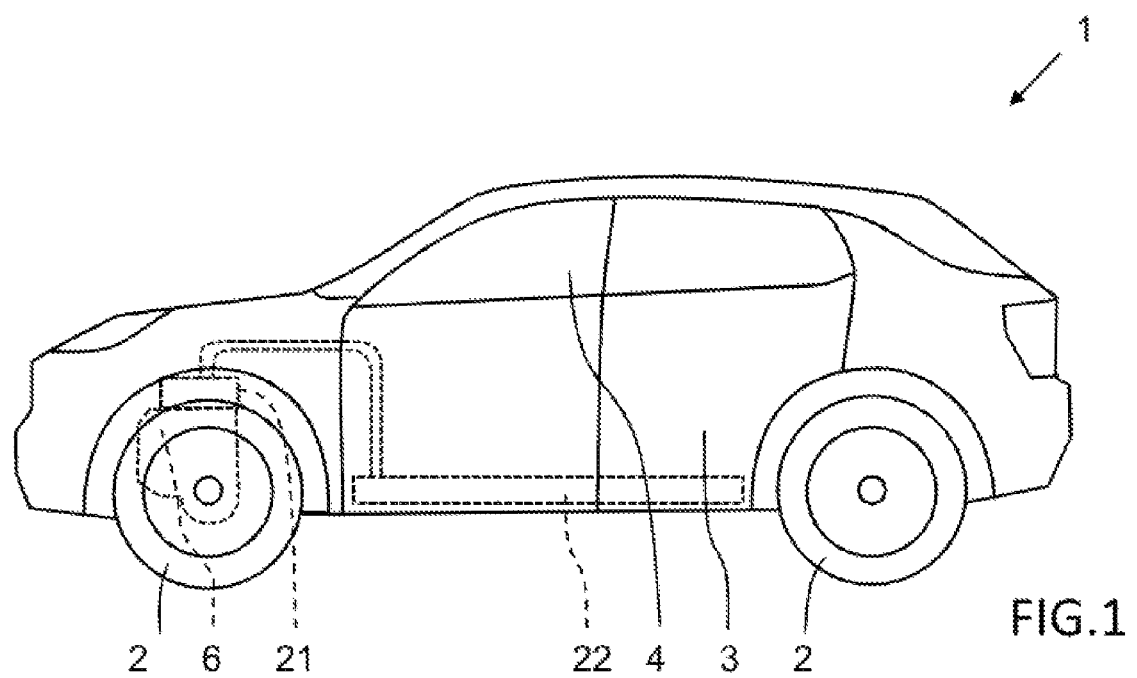
FIG. 1 shows schematically a vehicle that may be provided with a composite transmission housing according to the disclosure.

For the purpose of better describing some example embodiments of the composite transmission housing for a vehicle drive train transmission unit according to the disclosure more in detail, and for setting the composite transmission housing in a context, reference is first made to FIG. 1, which shows an example embodiment of a vehicle in form of a car 1 having wheels 2 and a body 3 with a passenger compartment 4. The car 1 has a vehicle drivetrain 5 for providing the propulsion force necessary for driving the vehicle 1.

Figure 2:
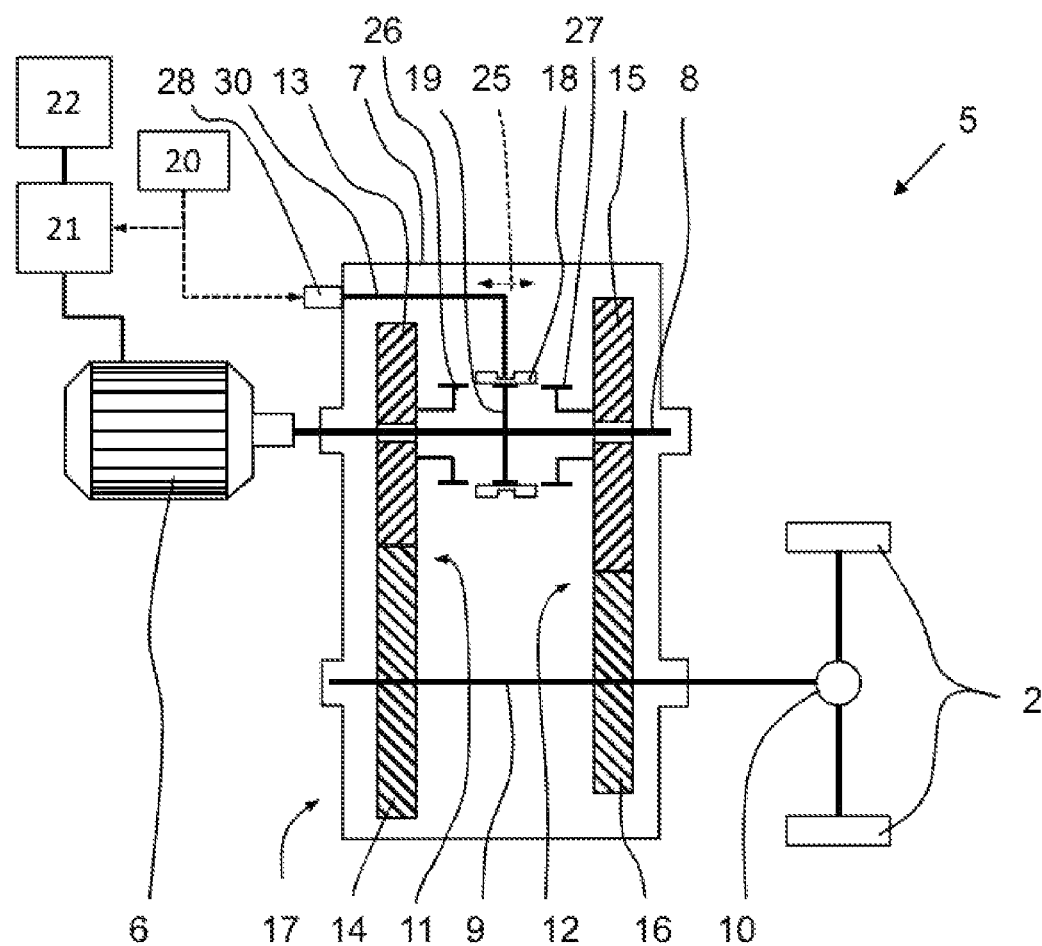
FIG. 2 shows schematically an example layout of a vehicle transmission that may include the composite transmission housing according to the disclosure.

A non-limiting example embodiment of the drivetrain 5 of the vehicle 1 of FIG. 1 is schematically illustrated in FIG. 2. In this example embodiment, the drivetrain includes a propulsion power source 6, such as an electric machine or an internal combustion engine that is drivingly connected with driving wheels 2 of the car via a transmission arrangement. The transmission arrangement includes for example a transmission unit 17 having a first transmission shaft 8 drivingly connected to the propulsion power source 6 and a second transmission shaft 9 drivingly connected to one or more wheels 2, for example via a differential gear transmission 10 and/or a drive shaft. The transmission unit 17 may for example include a transmission housing 7 holding a multi-speed transmission, a single-speed transmission, a continuously variable speed transmission, or the like, for providing a desired gear ratio between the first and second transmission shafts 8, 9.

In the example embodiment of FIG. 2, the transmission unit 17 includes a multi-speed transmission, i.e. a transmission with a plurality of discrete gears, wherein each gear has a unique gear ratio. Clearly, the composite transmission housing 7 and associated method for manufacturing such a housing 7 according to the disclosure is not limited to this type of transmission unit 17, which should merely be seen as a non-limiting example for describing the housing in an example context.

FIG. 2 shows a schematic illustration of an electric drive train 5 having an electric propulsion motor 6, a transmission unit 17, a differential gearbox and a set of driving wheels 2, wherein the transmission unit 17 includes a housing 17 and a two-gear automated manual transmission ATM. The transmission unit 17 according to this example embodiment has a constant mesh first gear 11 having a first gear ratio and a constant mesh second gear 12 having a second gear ratio.

The first gear 11 includes a freewheeling first gear wheel 13 arranged on, and rotatable relative to, the first transmission shaft 8 and in constant mesh with a second gear wheel 14 that is rotationally secured to the second transmission shaft 9. The second gear 12 includes a freewheeling third gear wheel 15 that is arranged on, and rotatable relative to, said first transmission shaft 8 and in constant mesh with a fourth gear wheel 16 that is rotationally secured to the second transmission shaft 9.

An axially displaceable shift sleeve 18, which is arranged on and rotationally secured to the first transmission shaft 8 via a hub 19, comprises a set of sleeve teeth, also referred to as dog teeth, which may be axially shifted in both directions along a shift axis 25 by means of a shifting actuator 28 and shift arm 30 for engaging corresponding teeth or dog teeth 26, 27 of the associated first and third gear wheels 13, 15, respectively, for enabling selection of a suitable transmission ratio between the first and second transmission shafts 8, 9, depending on the circumstances.

An electronic control system 20 is provided for controlling operation of the transmission unit 17, in particular for controlling operation of the shifting actuator 28. The electronic control system 20 may, as illustrated in FIG. 2, also be arranged for controlling operation of an electric power converter 21, such as for example an inverter, that is arranged for controlling the voltage and current supplied from a high-voltage fuel cell and/or a high-voltage electrical storage system 22, such as a battery, to the electric machine 6. The electronic control system 20 may implemented as a distributed system with a plurality of separate electronic controllers controlling smaller units, or by means of more centralized control system that controls a system including multiple smaller units.

As stated above, the illustrated two-gear transmission unit 17 is purely one example of many possible and alternative layouts, and the composite transmission housing according to the disclosure may be implemented and used in many other types of transmission units 17, such as for example single-gear transmission, three-gear up to but not limited to nine-gear transmission units, or even for example up to 25-gear transmission units, and the transmission unit may for example be implemented as a conventional and hybrid Dual Clutch Transmissions (DCT and DCTH) or Automated Manual Transmissions (AMT).

In addition, the transmission housing according to the disclosure may also be implemented in transmission units for many different types of drive trains, such as conventional combustion power drive trains having a combustion engine as primary power source, or hybrid power trains having both a combustion engine and an electrical machine as power sources for vehicle propulsion.

FIG. 3 shows schematically an external side-view, perpendicular to an axial direction AD, of part of an example drivetrain 5 including an electrical propulsion machine 6 drivingly connected with a transmission unit 17, and FIG. 4 shows schematically an axial external side-view of the same drivetrain 5.

Figure 5:
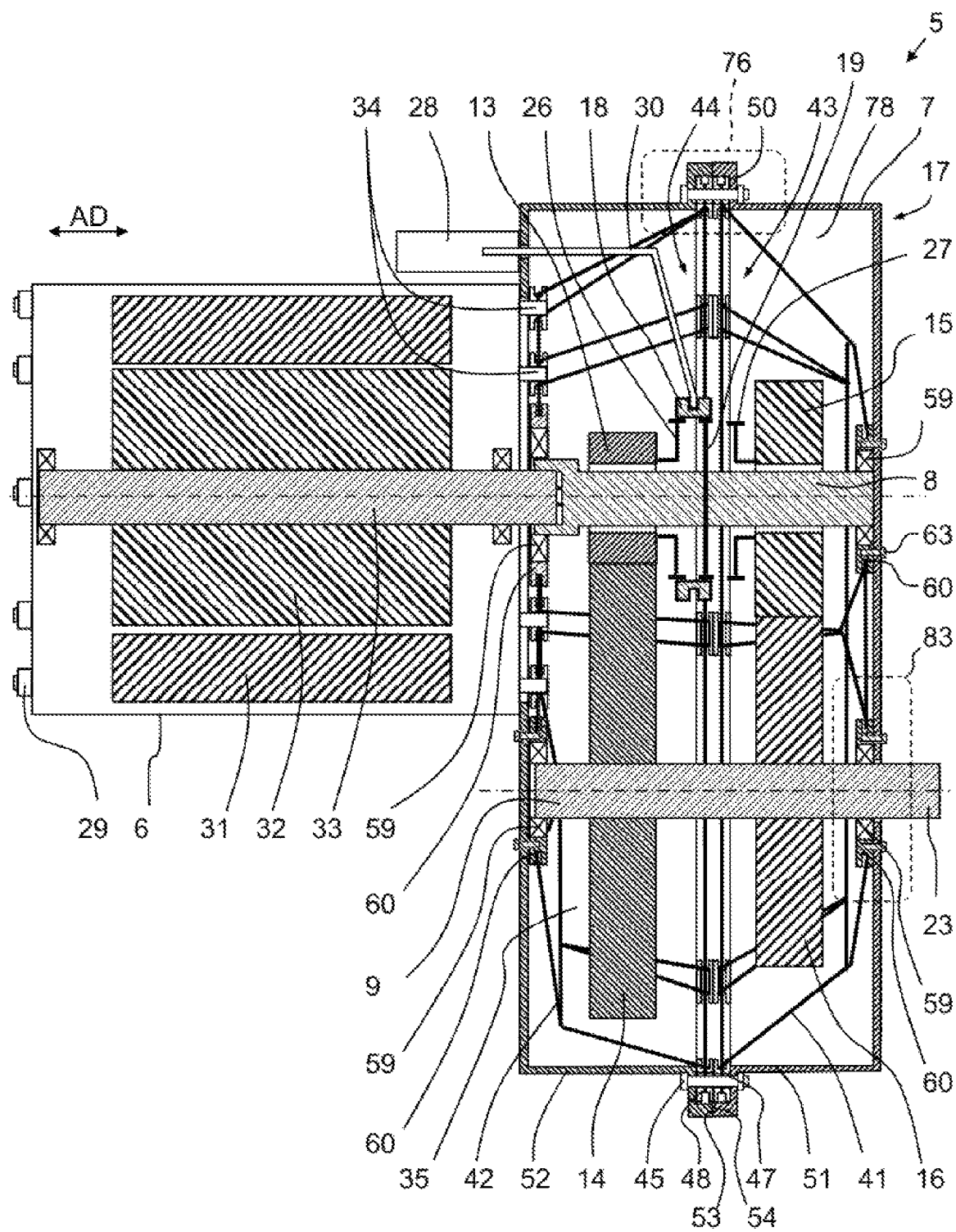
FIG. 5 shows schematically a cross-section of an example embodiment of the transmission housing.

FIG. 5, which represents a cross-section along cut A-A in FIG. 4, shows schematically the same drivetrain 5 as in FIG. 3 but in a cross-sectional view. The output shaft 23 of the transmission unit may for example be drivingly connected to a differential gearbox or to an individual driving wheel.

The example design and functionality of the first and second gears of the transmission unit 17 of FIG. 4, including the axially displaceable shift sleeve 18 controlled by means of the shifting actuator 28, is the same as described above with reference to FIG. 2 and will therefore not be repeated here. Reference is made to FIG. 2 and associated description passages for aspects relating to the gearwheels and changing of transmission ratio.

The electric machine 6 may be bolted directly to the exterior surface of the transmission housing 7, for example via a plurality of threaded bolts 29 that may be engaged in corresponding threaded attachment holes 34 in the housing 7. However, the propulsion power source may alternatively be arranged more remote from the housing 7 and merely drivingly connected to the first transmission shaft 8. The electrical machine 6 typically includes a stationary stator 31, a rotational rotor 32 arranged on a central torque output shaft 33.

The transmission housing 7 of the present transmission unit 17 is a composite transmission housing because it composed of several parts made of different types of material.

Specifically, the composite transmission housing is configured for sealingly enclosing a set of transmission shafts 8, 9 and gearwheels 13-16 and a lubricant fluid within an internal space 35 of the composite transmission housing 7. Furthermore, the composite transmission housing 7 comprises a first carbon-fibre skeleton part 41 having a first attachment region 43, a second carbon-fibre skeleton part 42 having a first attachment region 44, a first sealing cover 51 part made of plastic material and having a first sealing surface 53, and a second sealing cover 52 part made of plastic material and having a second sealing surface 54. The first attachment regions 43, 44 of the first and second carbon-fibre skeleton parts 41, 42 are mutually connected for providing a rigid structural framework that defines said internal space 35, and the first and second sealing surfaces 53, 54 of the first and second sealing cover parts 51, 52 are pressed together for providing a sealing envelope around said internal space.

In other words, the first and second sealing surfaces 53, 54 of the first and second sealing cover parts 51, 52 may be pressed together to be in direct mutual contact with each other for providing a sealing envelope around said internal space. Alternatively, the first and second sealing surfaces 53, 54 of the first and second sealing cover parts 51, 52 may be pressed together while having an intermediate sealing gasket arranged between the first and second sealing surfaces 53, 54 for providing a sealing envelope around said internal space.

Figure 6:
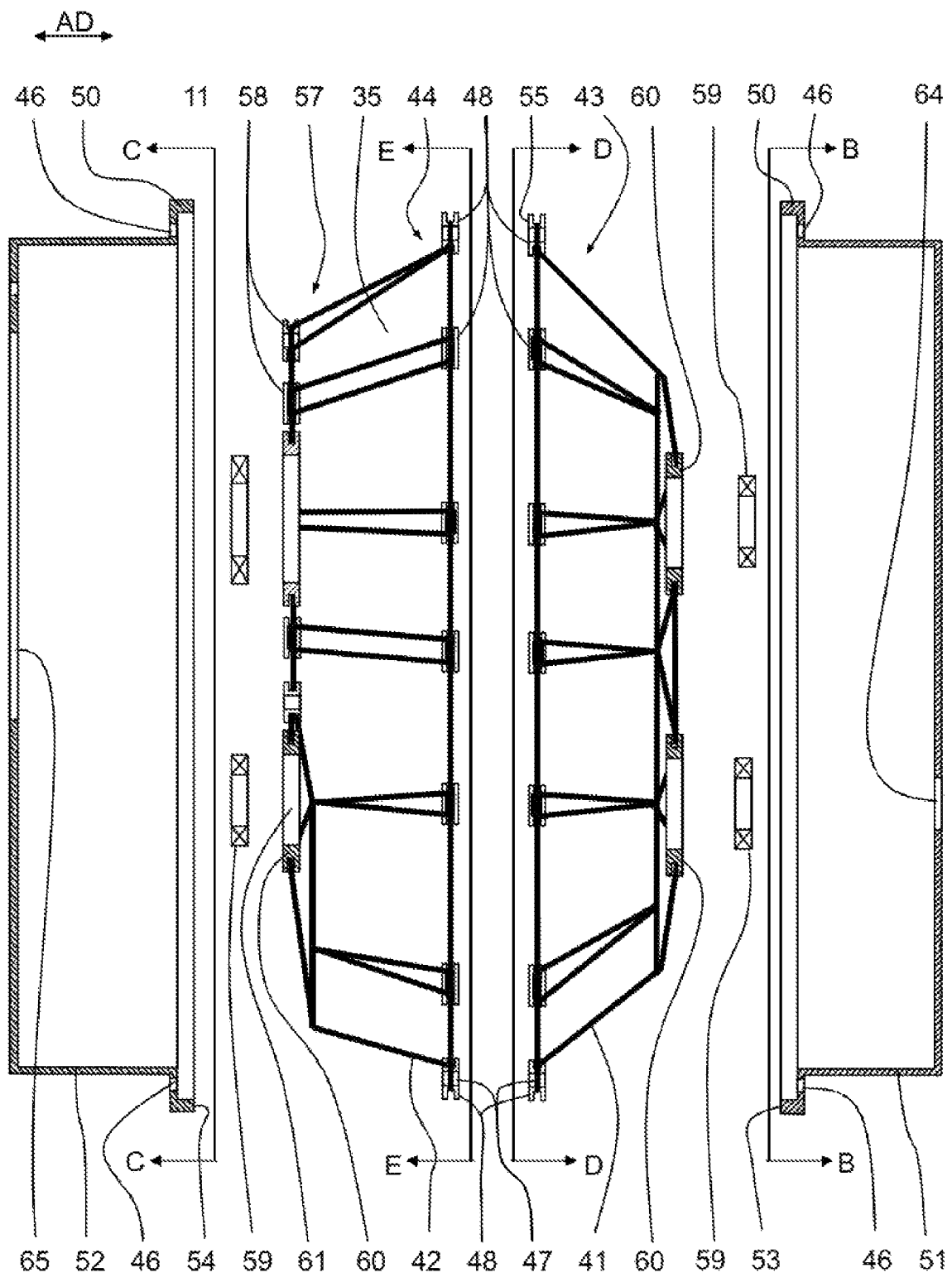
FIG. 6 shows schematically an exploded view of the housing of FIG. 5, FIGS. 7A-7B show schematically the first and second sealing cover parts of FIGS. 5 and 6, FIGS. 8A-8B show schematically the first and second carbon-fibre skeleton parts of FIGS. 5 and 6.

For describing the design and composition of the composite housing of FIGS. 3-5 more in detail, FIG. 6 is provided, which schematically shows an exploded view of a cross-section of the composite housing of FIG. 5, but here without the transmission shafts 8, 9, gear wheels 13-16 and gear shift arrangement.

Figure 7A:
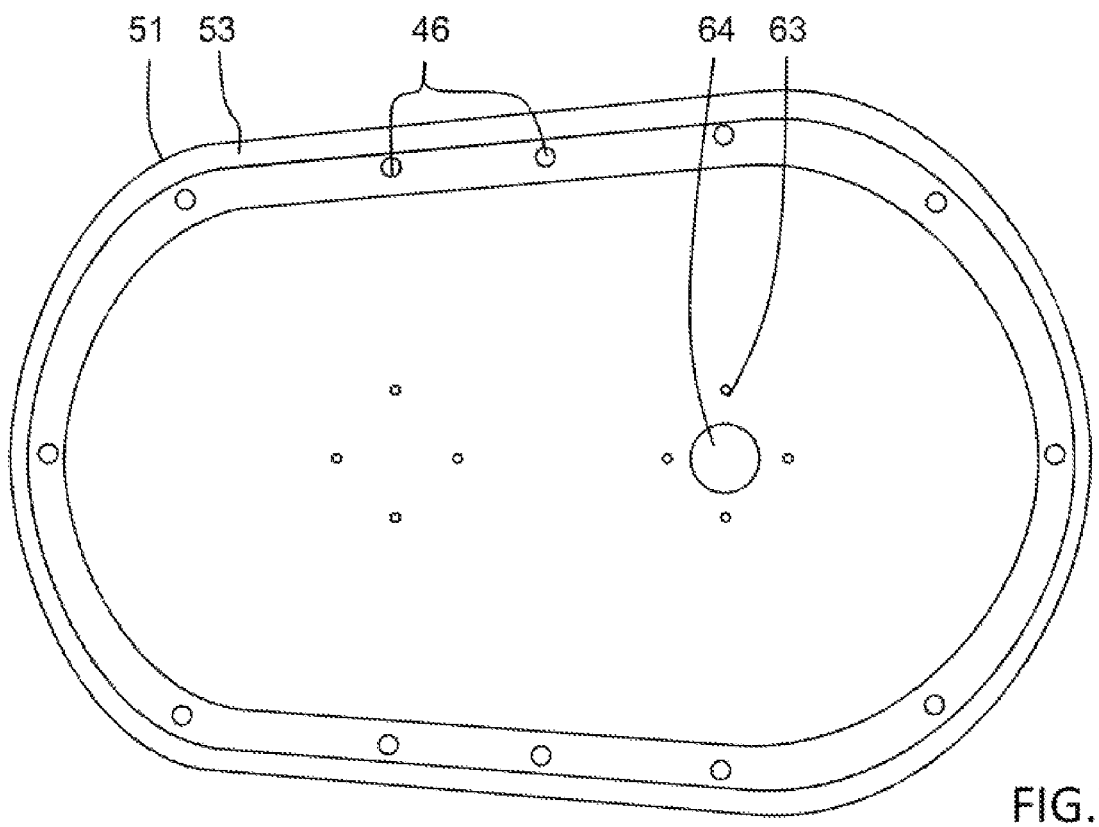
Figure 7B:
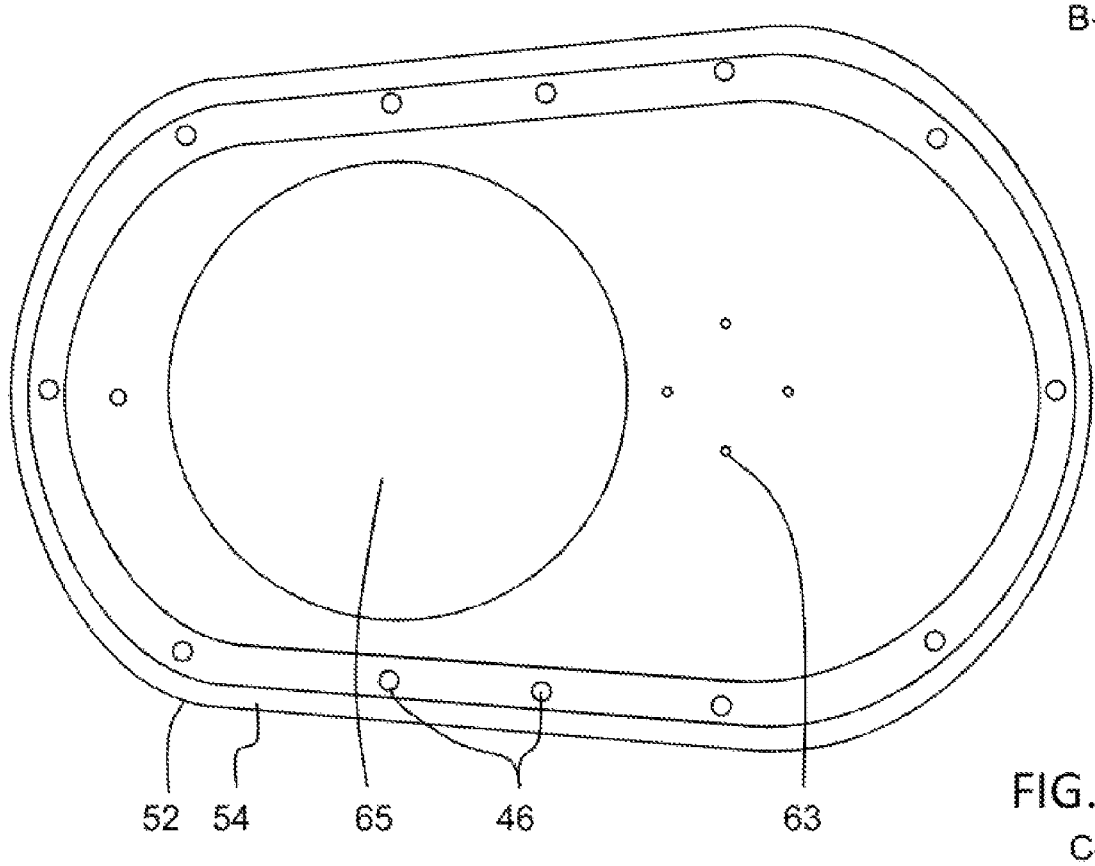
Figure 8A:
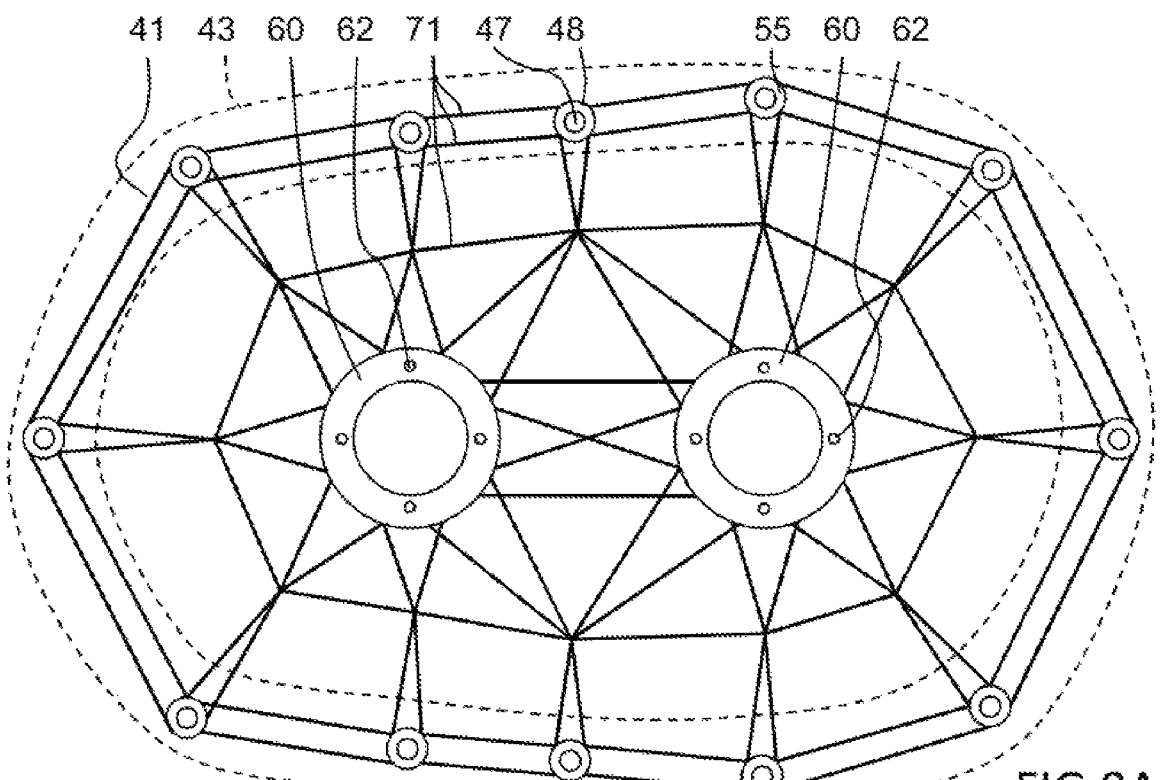
Figure 8B:
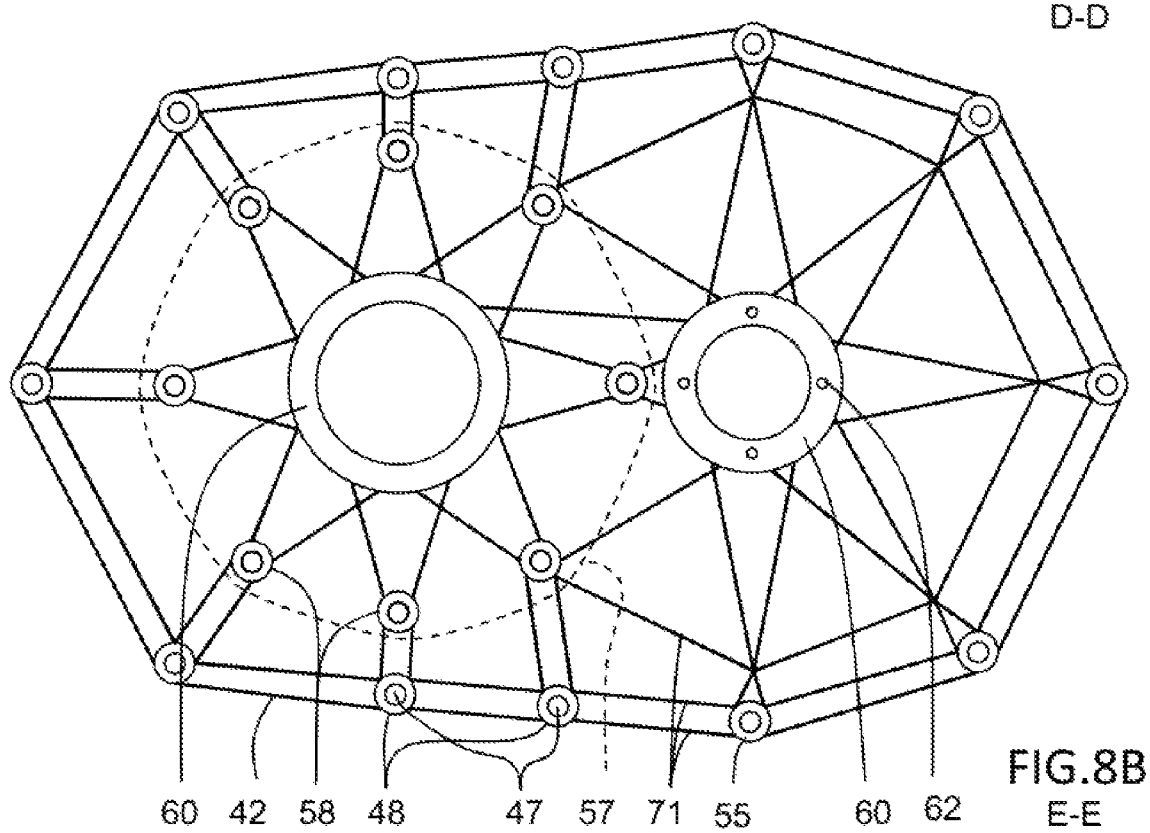

Similarly, FIGS. 7A and 7B are provided, which schematically shows axial side views of an interior surface of the first and second sealing covers 51, 52, respectively, according to view B-B and C-C of FIG. 6. In addition, FIGS. 8A and 8B are provided, which schematically shows axial side views of an interior surface of the first and second carbon-fibre skeleton part 41, 42, respectively, according to view D-D and E-E of FIG. 6.

As shown for example in FIG. 5, the first and second carbon-fibre skeleton parts 41, 42 and the first and second sealing cover parts 51, 52 may all be joined together by a set of common fasteners 45, in particular screws, each of which extends through and presses together all said parts 41, 42, 51, 52. In other words, the attachment holes 46 provided along the periphery of the first and second sealing cover parts 51, 52 match the attachment holes 47 provided along the periphery of the first and second carbon-fibre skeleton parts 51, 52, such that said attachment holes 46 of the sealing cover parts 51, 52 align with the attachment holes 47 carbon-fibre skeleton parts when mounted in proper mounting position. Consequently, each of the fasteners 45 used for assembling the first and second carbon-fibre skeleton parts 41, 42 and the first and second sealing cover parts 51, 52 into a single structure may be inserted through all said parts, when properly aligned, and used for clamping together all said parts to a final transmission housing. Thereby, fewer fasteners are required, thereby saving weight and cost, and fewer fasteners need to be tightened, thereby providing more cost-efficient manufacturing.

As illustrated in figures, the first and second sealing cover parts 51, 52 may according to some example embodiments of the composite transmission housing 7 be separate parts that are attached to, or assembled with, first and second carbon-fibre skeleton parts 41, 42, respectively, upon assembly of the composite transmission housing. In other words, the first and second sealing cover parts 51, 52 may be manufactured separately from the first and second carbon-fibre skeleton parts 41, 42 and all these parts may subsequently be assembled together by fasteners 45 to form the finished composite transmission housing 7. As a result, the assembled housing 7 may also generally be disassembled again be removal of the fasteners 45.

However, according to some other example embodiments, the first and second sealing cover parts 51, 52 may instead be overmoulded on an exterior or interior side of the first and second carbon-fibre skeleton parts 41, 42, respectively. This generally results in strong bonding of the first and second sealing cover parts 51, 52 to the first and second carbon-fibre skeleton parts 41, 42, thereby preventing the sealing cover parts 51, 52 to be removed of disassembled from the first and second carbon-fibre skeleton parts 41, 42 after completed moulding process. An advantage of an overmoulded first and second sealing cover parts 51, 52 to the first and second carbon-fibre skeleton parts 41, 42 may be reduced risk for noise and vibration due to relative movement between first and second sealing cover parts 51, 52 to the first and second carbon-fibre skeleton parts 41, 42. On the other hand, an advantage of separately manufactured first and second sealing cover parts 51, 52 may be less complex manufacturing, because overmoulding is a relatively complex manufacturing process.

As shown in FIG. 5, 6, 7A-7B, the sealing envelope formed by the first and second sealing cover parts 51, 52 substantially completely covers the rigid structural framework. Thereby, a more leak-proof housing is accomplished and with reduced risk for dirt or moisture entering the transmission housing. Some openings in the sealing envelope are however generally unavoidable, such as at interface regions, i.e. regions where the transmission shafts 8, 9 interacts with outside parts, or region where the clutch shifting arms enters the sealing envelope, etc.

In the example embodiment of FIG. 5, the first and second elongated transmission shafts 8, 9 extend in an axial direction AD of the transmission housing, and the fasteners 45 used for mutually joining at least first and second carbon-fibre skeleton parts 41, 42 also extend on said axial direction AD. Hence, the housing comprises an elongated transmission shaft 8, 9 having an elongated extension in the axial direction AD of the transmission housing, and the first attachment regions 43, 44 are assembled together by fasteners 45 extending in said axial direction AD. Thereby, assembly of the first and second transmission shafts 8, 9, with gearwheels mounted thereon, is simplified.

The first transmission shaft 8 is generally rotationally connected to the output shaft of the electric machine 6, for example via a suitable torque transfer connection. In the example embodiment of FIG. 5, the first transmission shaft 8 is telescoped rotationally connected with the output shaft of the electric machine 6.

As described above, each of the first and second carbon-fibre skeleton parts 41, 42 has a first attachment region 43, 44, and the first attachment region 43, 44 are mutually connected for providing a rigid structural carbon-fibre framework. According to some example embodiments, as illustrated in FIGS. 3-8B, the first attachment regions 43, 44 of each of the first and second carbon-fibre skeleton parts 41, 42 include a plurality of attachment holes 47 distributed around a first attachment regions 43, 44, i.e. along the contact periphery between the first and second carbon-fibre skeleton parts 41, 42 in FIGS. 3-8B.

The attachment holes 47 of the first attachment regions 43, 44 may for example be provided in a peripheral flange 50 of the first and second sealing cover parts 51, 52

In other words, each of the first and second carbon-fibre skeleton parts 41, 42 may for example have a substantially bowl-shaped and including an interior side, an exterior side and a rim for connection with another of said parts 41, 42, wherein a plurality of attachment holes 47 are distributed around the rim of the first and second carbon-fibre skeleton parts 41, 42 for enabling mutual connection of the first and second carbon-fibre skeleton parts 41, 42 by means of the fasteners 45.

These attachment holes 47 may be provided directly in the carbon-fibre structure of the first attachment region 43, 44 of the first and second carbon-fibre skeleton parts 41, 42. Alternatively, some type of inserts, in particular attachment inserts 48, may be fastened to the first and second carbon-fibre skeleton parts 41, 42 and used for mutually connecting the first and second carbon-fibre skeleton parts 41, 42.

The insert, such as an attachment insert 48, may be advantageous in term of enabling machining of the insert 48 after curing of the first and second carbon-fibre skeleton parts 41, 42. Machining herein refers to for example a material removal process, such as milling, drilling, grinding, or the like, and the material of the insert 48 may be metal, such as aluminium alloy, steel, etc., or plastic material, such as polyurethane. Since correct final positioning of the attachment hole 47, or insert 48 if such is used, within the first and second carbon-fibre skeleton parts 41, 42 during manufacturing and curing, machining of the insert 48 after finalized curing offers the advantage of enabling perfectly flat contact surfaces between the first and second carbon-fibre skeleton parts 41, 42, as well as perfectly aligned attachment holes 47 within the first attachment region 43, 44. Moreover, a metal insert 48 is generally more suitable for withstanding the high compression force generated by the fasteners 45, thereby reducing the risk or damages on the first and second carbon-fibre skeleton parts 41, 42.

As shown in FIG. 6, the attachment insert 48 typically has a flat front surface 55, i.e. the abutment surface of the attachment insert 48 facing the other carbon-fibre skeleton part, for enabling flat contact surfaces between the first and second carbon-fibre skeleton parts 41, 42.

The rigid structural framework of the transmission housing 7 may include further attachment holes, attachment regions and/or attachment inserts for various purposes. For example, one or both of the first and second carbon-fibre skeleton parts 41, 42 may include further attachment holes arranged directly in the carbon-fibre skeleton or in one or more attachment inserts for improved attachment of the first and second sealing cover parts 51, 52 to the first and second carbon-fibre skeleton parts 41, 42. In particular, it may be appropriate to fasten the first and second sealing cover parts 51, 52 at some more locations in addition to those arranged at the peripheral flange 50 of the first and second sealing cover parts 51, 52, for the purpose of reducing the risk for undesired vibration interference between the first and second sealing cover parts 51, 52 and the first and second carbon-fibre skeleton parts 41, 42.

For example, in some example embodiments, it may be appropriate to provide some additional attachment holes arranged directly in the first or second carbon-fibre skeleton parts 41, 42, or in one or more attachment inserts secured to the first or second carbon-fibre skeleton parts 41, 42, wherein the additional attachment holes are arranged in bottom region of the bowl-shaped first or second carbon-fibre skeleton parts 41, 42, i.e. at a location remote from the first attachment regions 43, 44 of the first and second carbon-fibre skeleton parts 41, 42, as complementary attachment.

The additional attachment holes are for example threaded for simplifying attachment of the first and second sealing cover parts 51, 52 to the first and second carbon-fibre skeleton parts 41, 42.

Furthermore, in those example embodiments where for example a power propulsion source 6, such as an electrical machine, is fastened to the transmission housing 7, the rigid structural framework of the transmission housing 7 may include further attachment holes, attachment regions and/or attachment inserts for this purpose.

For example, as schematically illustrated in FIGS. 5, 6, and 8B, one of the first and a second carbon-fibre skeleton parts 41, 42 may include a second attachment region 57 with a plurality of attachment inserts 58 for enabling attachment of the electrical machine 6 to the transmission housing 7. As described above, the electric machine 6 may then for example be bolted directly to the exterior surface of the transmission housing 7 via a plurality of threaded bolts 29 that are engaged in corresponding threaded attachment holes 34 of the attachment inserts 58 of the first or a second carbon-fibre skeleton parts 41, 42.

Furthermore, as schematically illustrated in FIGS. 5, 6, and 8B, at least one, specifically both, of the first and second carbon-fibre skeleton parts 41, 42 has a bearing 59, such as a roller bearing, secured thereto, wherein the bearing 59 rotatably supports one of the first and second transmission shafts 8, 9 that is mounted within the bearing. The bearing 59, which is for example made of metal of plastic material, may be mounted within a hole provided in the first and second carbon-fibre skeleton parts 41, 42. For example, the bearing 59 may be press fitted or otherwise fastened to a pre-manufactured hole within the first and second carbon-fibre skeleton parts 41, 42.

Alternatively, the bearing 59 may be fastened to the first and second carbon-fibre skeleton parts 41, 42 by winding continuous carbon-fibre tow around the bearing, during manufacturing of the first and second carbon-fibre skeleton parts 41, 42, and thereafter curing the carbon-fibre tow for rigidly attaching the bearing to the first and second carbon-fibre skeleton parts 41, 42.

According to yet a further alternative, one or both of the first and second carbon-fibre skeleton parts 41, 42 has a bearing insert 60 secured thereto, wherein the bearing 59 is fastened within the bearing insert 60. This bearing insert 60 provide the advantage of enabling machining of the bearing insert 60 after curing of the carbon-fibre structure to ensure proper alignment of the bearings 59 of a common shaft 8, 9, as well as proper lateral distance between first and second transmission shafts 8, 9 for providing correct meshing properties of the gearwheels. The bearing inserts 60 may for example by secured to the carbon-fibre structure by winding continuous carbon-fibre tow around the bearing 59, during manufacturing of the first and second carbon-fibre skeleton parts 41, 42, and thereafter curing the carbon-fibre tow for rigidly attaching the bearing insert 60 to the first and second carbon-fibre skeleton parts 41, 42.

In particular, an annular exterior surface of the bearing 59 may be press fitted in, or otherwise secured to, an annular interior hole 61 of the bearing insert 60.

With reference to FIGS. 4, 5, 7A-7B, 8A-8B, the bearing insert 60 may for example have a spool-shape, i.e. an annular shape with left and right side flanges for holding and securing the wound carbon-fibre tow to the bearing insert 60.

In the example embodiment of the transmission housing showed in FIGS. 3-7B the first and second sealing cover parts 51, 52 jointly provides a surrounding sealing container around the rigid structural framework.

Each of the first and second sealing cover parts 51, 52 may have a bowl-shape including an interior side, an exterior side and a rim for sealing contact with the other of said parts. Hence, the first and second sealing surfaces 53, 54 are provided at the rim of each part, in particular in the region of the peripheral flange 50 of the first and second sealing cover parts 51, 52.

Moreover, in addition to the aforementioned attachment holes 46 provided along the periphery of the first and second sealing cover parts 51, 52 for fastening the sealing cover parts 51, 52 to each other and/or to the first and second carbon-fibre skeleton parts 41, 42, the first and second sealing cover parts 51, 52 may be fastened to the associated first and second carbon-fibre skeleton parts 41, 42 at more locations. For example, the rigid structural framework of the transmission housing 7 may include further attachment holes, attachment regions and/or attachment inserts for various purposes. For example, one or both of the first and second carbon-fibre skeleton parts 41, 42 may include further attachment holes arranged directly in the carbon-fibre skeleton or in one or more attachment inserts for improved attachment of the first and second sealing cover parts 51, 52 to the first and second carbon-fibre skeleton parts 41, 42. In particular, it may be appropriate to fasten the first and second sealing cover parts 51, 52 at some more locations in addition to those arranged at the peripheral flange 50 of the first and second sealing cover parts 51, 52, for the purpose of reducing the risk for undesired vibration interference between the first and second sealing cover parts 51, 52 and the first and second carbon-fibre skeleton parts 41, 42.

For example, as schematically illustrated in FIGS. 4, 5, 7A-7B and 8A-8B, one or more of the bearing inserts 60 of the first and second carbon-fibre skeleton parts 41, 42 may be provided with one or more internally threaded holes 62 configured for attaching the first and second sealing cover parts 51, 52 thereto via threaded fasteners 87 that extend through dedicated attachment holes 63 in the first and second sealing cover parts 51, 52.

In FIG. 7A, an additional hole 64 is provided for outlet passage of the second transmission shaft 9 for transmitting propulsion torque to the driving wheels. Moreover, in FIG. 7B, an additional hole 65 is provided for attachment of the electrical machine 6 to the transmission housing 7.

The first and second sealing cover parts 51, 52 may for example be made of a thermosetting plastic or polymer material or similar low-viscoelastic and/or low-creep polymer materials. For example, the first and second sealing cover parts 51, 52 may for be made of non-fibre-reinforced epoxy resin or other material having similar low-creep characteristic, e.g. having a creep resistance of at least 75%, specifically at last 90%, of that of epoxy resin. Phenolic resins, amino resins, polyester resins, silicone resins, epoxy resins, and polyurethanes are some examples of thermosetting polymeric material that may be used for manufacturing the first and second sealing cover parts 51, 52. The first and second sealing cover parts 51, 52 may alternatively be made of fibre-reinforced thermoset polymer material.

FIGS. 8A and 8B shows the interior side of the first and second carbon-fibre skeleton parts 41, 42, respectively. The position of the plurality of attachment inserts 48, 58 and the design or pattern of the carbon-fibre skeleton is preferably selected to provide a strong, rigid and reliable rigid structural framework after joining of the first and second parts 41, 42. For example, the selected design or pattern may be calculated or determined by performing a three-dimensional stress and/or strain based topology optimization or generative design of the transmission housing. A stress and/or strain based topology optimization may for example be performed using Finite Element Method (FEM), i.e. Finite Element Analysis.

In general, sizing, shape and topology optimization, as well as generative design, relate to different aspects of identifying an optimal design. Sizing optimization concerns finding an optimal thickness of component cross section area, and shape optimization relate finding out the optimal shape within a given design domain, and topology optimization relates to identifying optimal material distribution within predefined design domain.

Topology optimization methods are often based on FEM and may include a sensitivity analysis. Topology optimization methods generally utilize each finite element in a mesh for FEM, and each finite element is assigned as a design variable, such as for example material density of the element. By calculating stress and strain levels for each iteration, the parameter value, e.g. material density, of each element may be iteratively updated for arriving at an optimal design.

Consequently, one example strategy for performing a stress and/or strain based topology optimization may involve to first prepare an initial design of the transmission housing with certain design limitations, such as external space, connection interface with propulsion power source and drive shaft of the driving wheels, space for internal gearwheels etc. The walls of the transmission housing of the initial design may for example be solid walls. Thereafter, resulting stress and/or strain levels are calculated when certain forces/ torques are applied to the transmission housing and/or shafts for simulating use of the transmission housing. The regions of the transmission housing having low stress and/or strain levels are then removed from the design and a new iteration is performed involving a new stress and/or strain level calculation and resulting removal of material. This is then continued until a certain stopping criteria is fulfilled, such as lowest and/or highest stress and/or strain level exceeds certain threshold value(s). The resulting pattern may then be used for determining the position of the plurality of attachment inserts 48, 58 and the design or pattern of the carbon-fibre skeleton.

For example, the carbon-fibre structure of first and second carbon-fibre skeleton parts 41, 42 may then have a pattern corresponding to the stress vectors of the transmission housing, as derived by Finite Element Analysis.

Not only topology of the framework may be optimized, but also aspects such as material thickness and sizes of various parts of the transmission housing may be optimized using finite element analysis, i.e. a structural optimization of the transmission housing.

The first or second carbon-fibre skeleton parts 41, 42 may be manufactured in various alternative ways. FIG. 9 shows schematically a 3D view of a fixture or mould 66 for one example approach for manufacturing the first or second carbon-fibre skeleton parts 41, 42. This approach involves producing the carbon-fibre structure by first winding a carbon-fibre tow around a set of posts or other objects of a fixture or mould until a desired thickness has of the individual connection arms or segments have been arrived at. The carbon-fibre tow may for example be pre-impregnated during manufacturing process of the manufacturer of the carbon-fibre tow, such that additional impregnation is not necessary when performing the winding operation. Alternatively, the carbon-fibre tow may be impregnated by a resin just prior to winding the carbon-fibre tow on the fixture or mould, for example by routing the continuous carbon-fibre tow down into a dipping tank or coating tank.

FIG. 12 schematically shows a continuous filament carbon-fibre tow wound on a spool and ready for being used for manufacturing of the first and second carbon-fibre skeleton parts 41, 42.

After finalised winding process, the fixture or mould with wound carbon-fibre structure is cured to provide the final, rigid, first or second carbon-fibre skeleton parts 41, 42.

The fixture or mould 66 of FIG. 9, which may be used for manufacturing for the example the first carbon-fibre skeleton part 41, as a bottom surface 67 and a top surface 68. Two annular projections 69 or the like may be provided at the bottom surface and arranged to receive the bearing attachments 60. In addition, a plurality of post 70 are provided at certain locations for enabling winding of the continuous carbon-fibre tow around the various components of the first carbon-fibre skeleton part 41.

If attachment inserts 48, 58 are desired, these may be mounted on said posts 70, as illustrated in FIG. 10, which shows a cross-section of the fixture or mould through two individual posts 70. Specifically, in this example design, an attachment inserts 48 of the first attachment region 43 is mounted on a post located on the top surface 68, and a post without any insert is provided at the bottom surface 67. A continuous carbon-fibre tow is schematically shown wound around the attachment insert 48 and the post 70 at the bottom surface 67 to form a carbon-fibre arm or segment 71. After curing of the carbon-fibre structure, it may be lifted and separated from the fixture or mould, which is used for manufacturing a new carbon-fibre skeleton part.

The attachment insert 48 of FIG. 10 has a spool-shape, i.e. an annular shape with left and right side flanges 73 for holding and securing the wound carbon-fibre tow to the attachment insert 48.

A top-view of an example embodiment of the attachment insert is schematically illustrated in FIG. 11A, having an interior central annular spool 74 with interior attachment hole 47, and left and right side flanges 73 for holding and securing the wound carbon-fibre tow to the attachment insert 48.

A top-view of a further example embodiment of the attachment insert is schematically illustrated in FIG. 11B, having an interior central annular spool 74 with interior attachment hole 47, and left and right side flanges 73 for holding and securing the wound carbon-fibre tow to the attachment insert 48. Moreover, circular segments 75 of the lower flange 73 are omitted for simplifying wounding of continuous filament carbon-fibre tow around the attachment insert.

The winding process may be automated and performed using industrial robots. Hence, the manufacturing process of the first and second carbon-fibre skeleton parts 41, 42 may be highly automatized and this cost-efficient, and the winding manufacturing process produces substantially no waste material.

Some kind of end stops 72 may be temporarily mounted on the posts 70 during manufacturing for simplifying the winding process, as schematically illustrated in FIG. 13, because it reduces the risk the wound laps of continuous carbon-fibre tow accidentally slips of the post too early due to the desired three-dimensional form of the first and second carbon-fibre skeleton parts 41, 42. Moreover, a removable end stop 72 may also enable simplified separate of the carbon-fibre structure from the fixture 66. Alternatively, other types inserts may be mounted on the posts for simplifying winding and/or removal of the carbon-fibre structure.

FIG. 14 shows a schematic view of a series of posts 70 of a fixture or mould 66 that used for manufacturing an elongated carbon-fibre structure having a certain shape, wherein a continuous carbon-fibre tow is wound around each of the posts 70 separately.

Figure 15B:
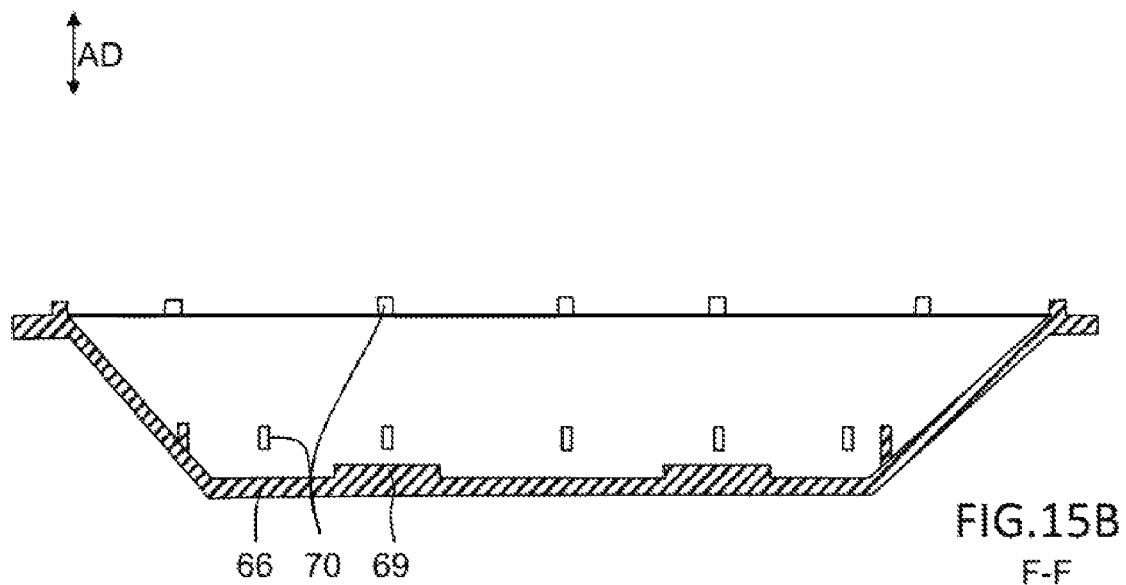
FIGS. 15A-18 show various manufacturing steps of the carbon-fibre framework.
Figure 15A:
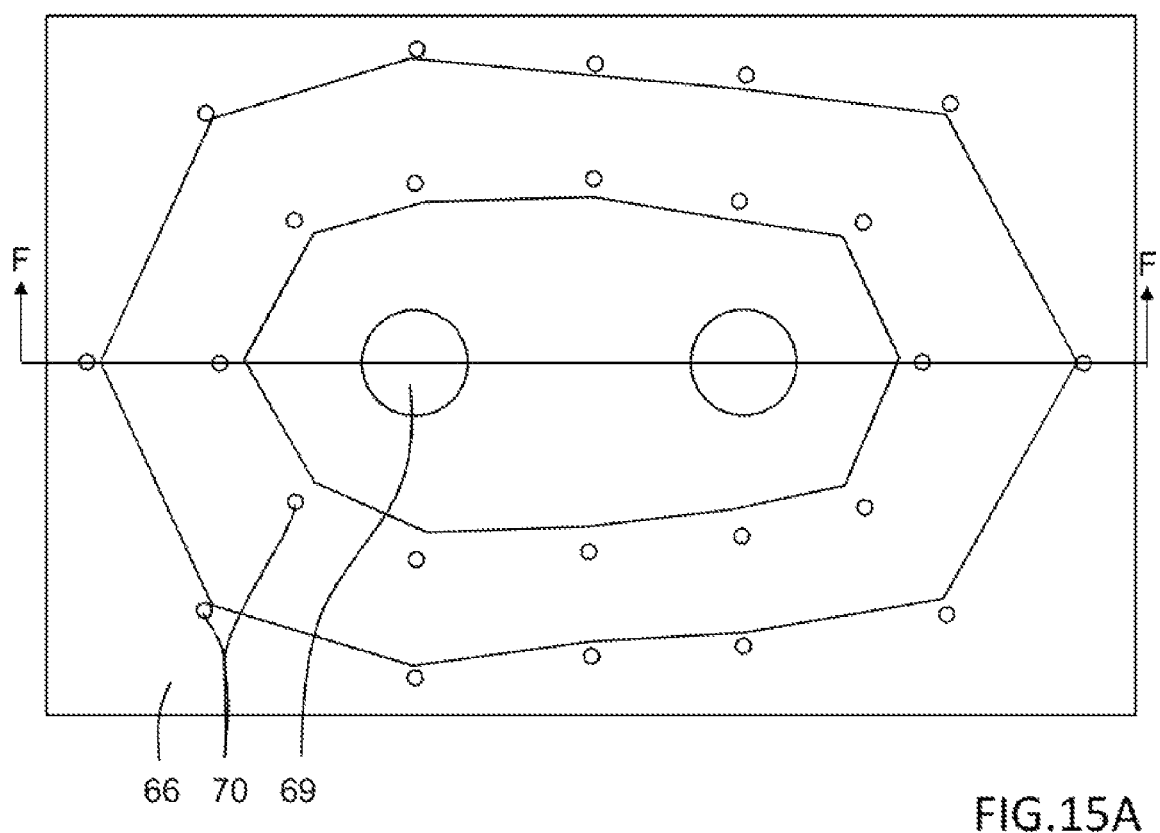
Figure 16B:
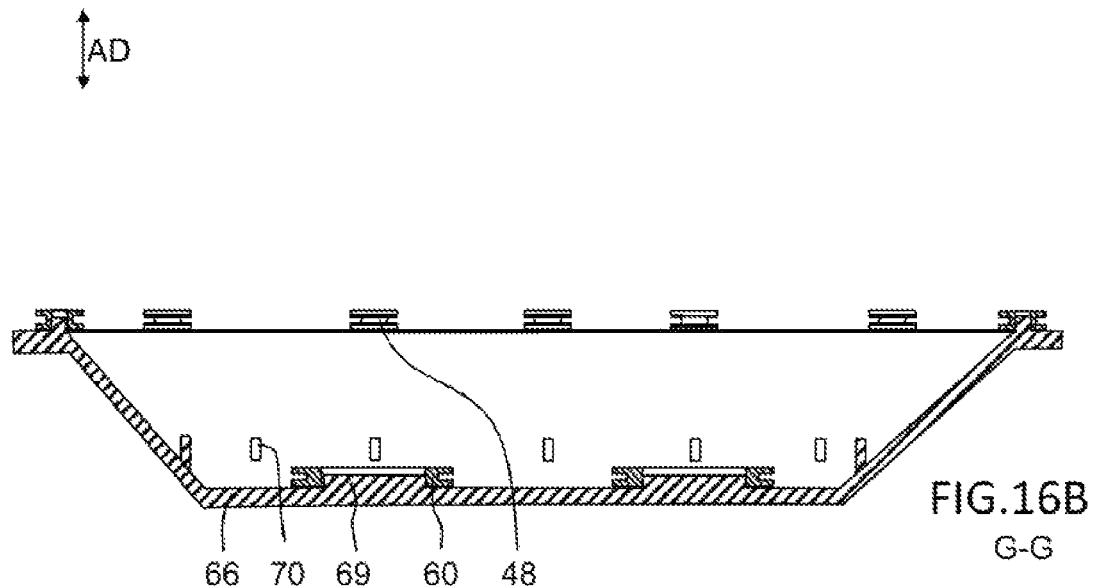
Figure 16A:
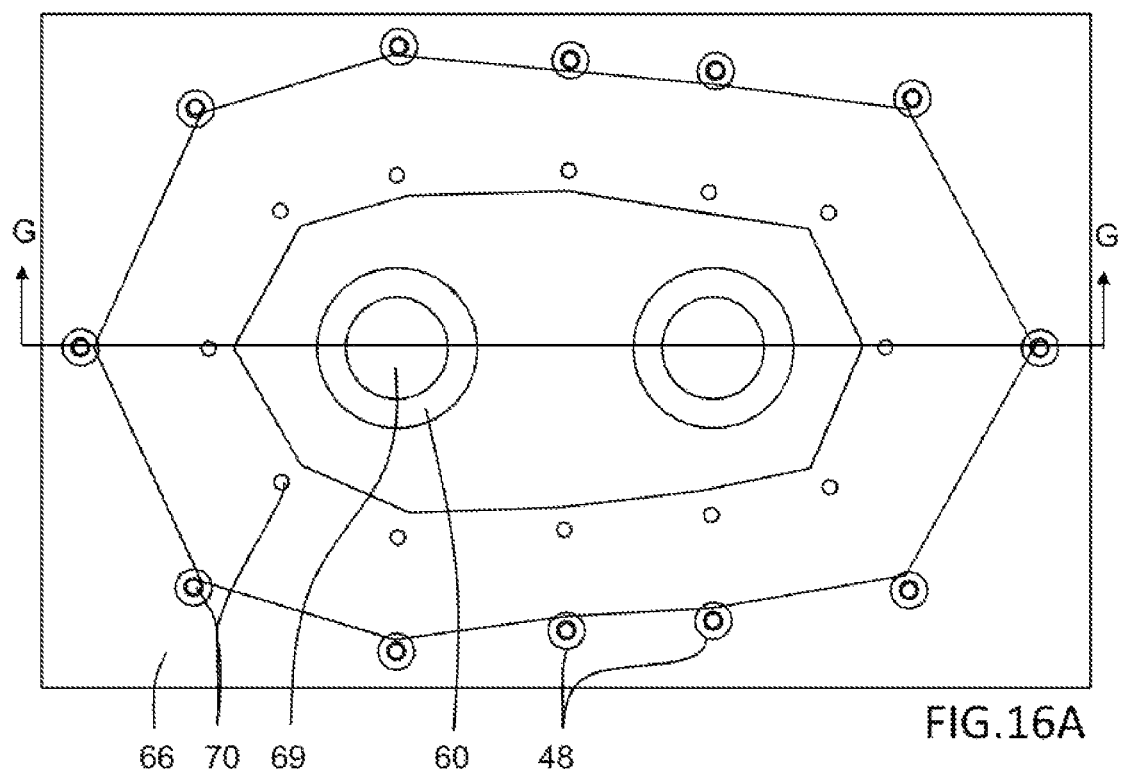
Figure 17B:
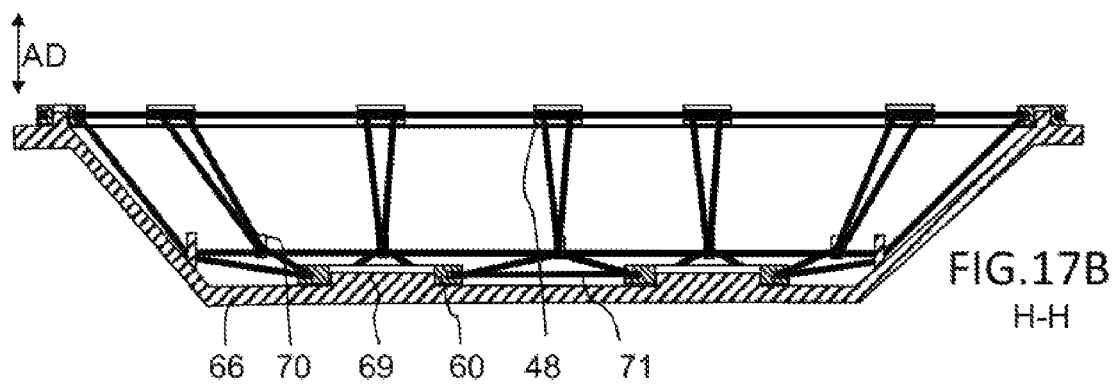
Figure 17A:
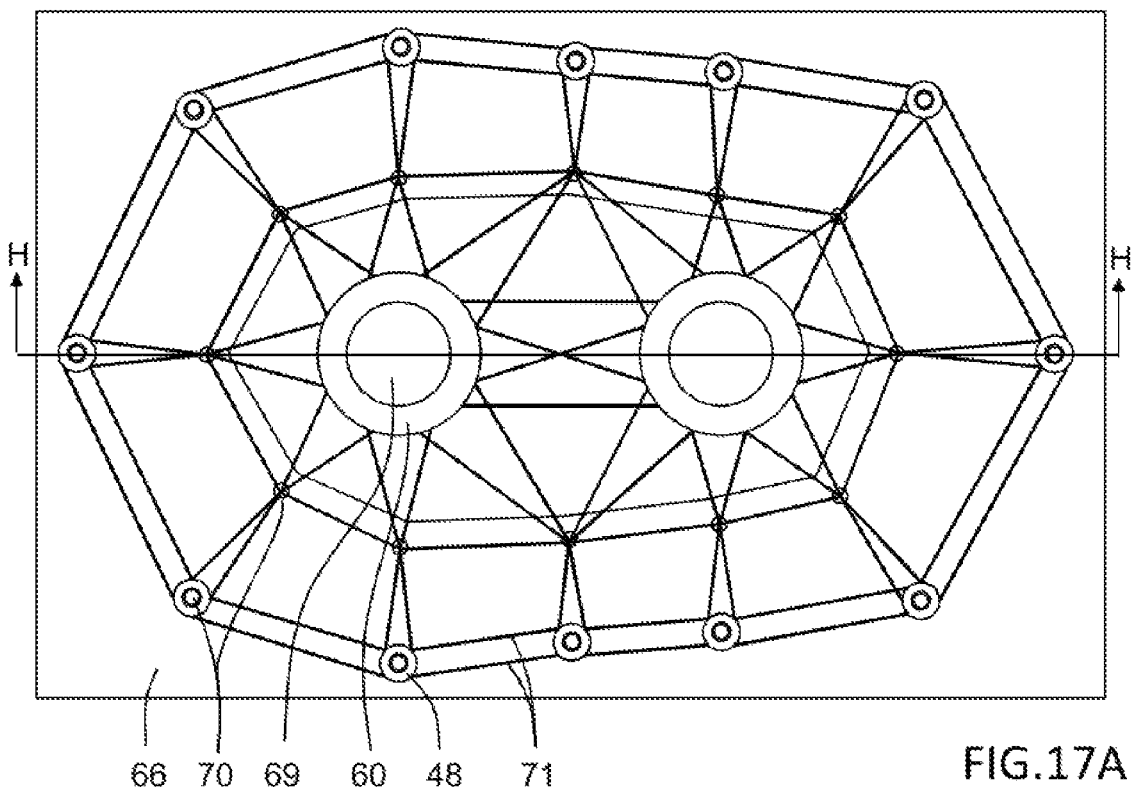

The method for manufacturing for example the first carbon-fibre skeleton part 41 is described hereinafter with reference to FIGS. 15A-18, wherein FIGS. 15A and 15B represents a first state, FIGS. 16A and 16B represents a second, subsequent, state, FIGS. 17A and 17B represents a nearly finished state, and FIG. 17 shows final the separation state.

FIG. 15A shows schematically a first fixture or mould 66 having plurality of posts 70 permanently jointed to the fixture or mould, and two annular projections 69 permanently jointed to a bottom surface of the fixture or mould.

The position of the plurality of posts 70 of the fixture or mould and selected for enabling a winding pattern of the continuous filament carbon-fibre tow, such that the resulting carbon-fibre structure has a pattern corresponding to stress vectors as derived by stress and/or strain based topology optimization of the transmission housing. Moreover, two annular projections 69 are provided for receiving bearing insert 60.

FIG. 15B shows schematically a cross-section through the fixture or mould 66 along section F-F of FIG. 15A.

FIG. 16A shows the same fixture or mould 66 as FIG. 15A but now in a subsequent state, in which a set of attachment inserts 48 have been mounted on some of the posts 70, while some other posts 70 remain without inserts, and two bearing inserts 60 have been mounted on the two annular projections 69.

FIG. 16B shows schematically a cross-section through the fixture or mould 66 along section F-F of FIG. 16A.

FIG. 17A shows the same fixture or mould 66 as FIG. 16A but now in still a further subsequent state, in which a one or more rolls of continuous filament carbon-fibre tow has been wound along a pattern around the plurality of posts, attachment inserts 48 and bearing inserts 60 for producing a first intermediate part. The selected winding pattern of the continuous filament carbon-fibre tow is for example such that the resulting carbon-fibre structure has a pattern corresponding to stress vectors as derived by stress and/or strain based topology optimization of the transmission housing. The winding is continued until a desired thickness of each individual carbon-fibre arm or segment 71 of the carbon-fibre structure is accomplished. The winding may be performed manually but a robotic winding process is preferred.

FIG. 17B shows schematically a cross-section through the fixture or mould 66 along section H-H of FIG. 17A.

The wound continuous filament carbon-fibre tow is for example pre-impregnated or impregnated just before winding via for example a dipping tank.

The continuous filament carbon-fibre tow is made of for example at least 75%, specifically at least 90%, and more specifically at least 97% carbon fibre material.

Furthermore, the continuous filament carbon-fibre tow includes for example a bundle of about 1000-200 000 twisted or untwisted continuous carbon filaments per tow, specifically about 5000-50 000 twisted or untwisted continuous carbon filaments per tow.

Thereafter, the first intermediate carbon-fibre skeleton part 41 is cured for providing the first, final, rigid carbon-fibre skeleton part 41. Typical curing process are autoclaving or heating in an oven, but other curing processes may be used.

Figure 18:
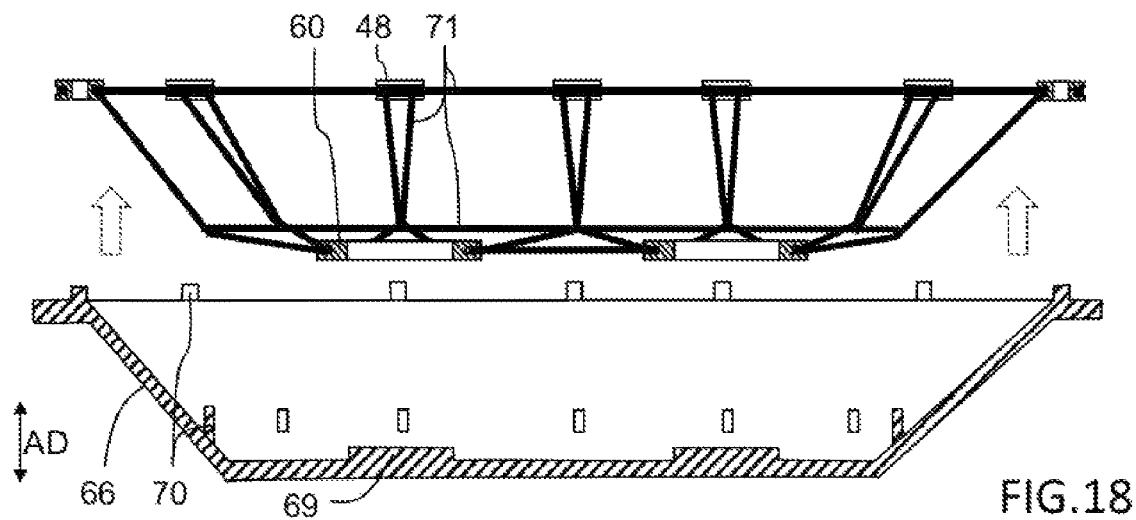

After curing, the rigid final carbon-fibre skeleton part 41 is separated from the fixture or mould, as schematically illustrated in FIG. 18. The second carbon-fibre skeleton part 42 is manufactured in a corresponding manner.

Each of the first and second sealing cover parts 51, 52 may for example be manufactured individually by injection moulding or the like.

The first and second carbon-fibre skeleton parts 41, 42 and the first and second sealing cover parts 51, 52 may then finally be joined together by a set of common fasteners 45, each of which extends through and presses together all said parts, as illustrated in FIG. 5.

In other words, the resulting first skeleton part 41 has a first set of attachment inserts 48 secured thereto in the first attachment region 43 by means of continuous filament carbon-fibre being wound thereon, and the second skeleton part 42 has a second set of attachment inserts 48 secured thereto in the first attachment region 44 by means of continuous filament carbon-fibre being wound thereon, and the first and second carbon-fibre skeleton parts 41, 42 are then mutually connected by fastening the first set of attachment inserts 48 with the second set of attachment inserts 48. Moreover, the first and second sealing cover parts are separate parts that are attached to the first and second carbon-fibre skeleton parts 41, 42, respectively, upon assembly of the composite transmission housing 7.

Figure 19:
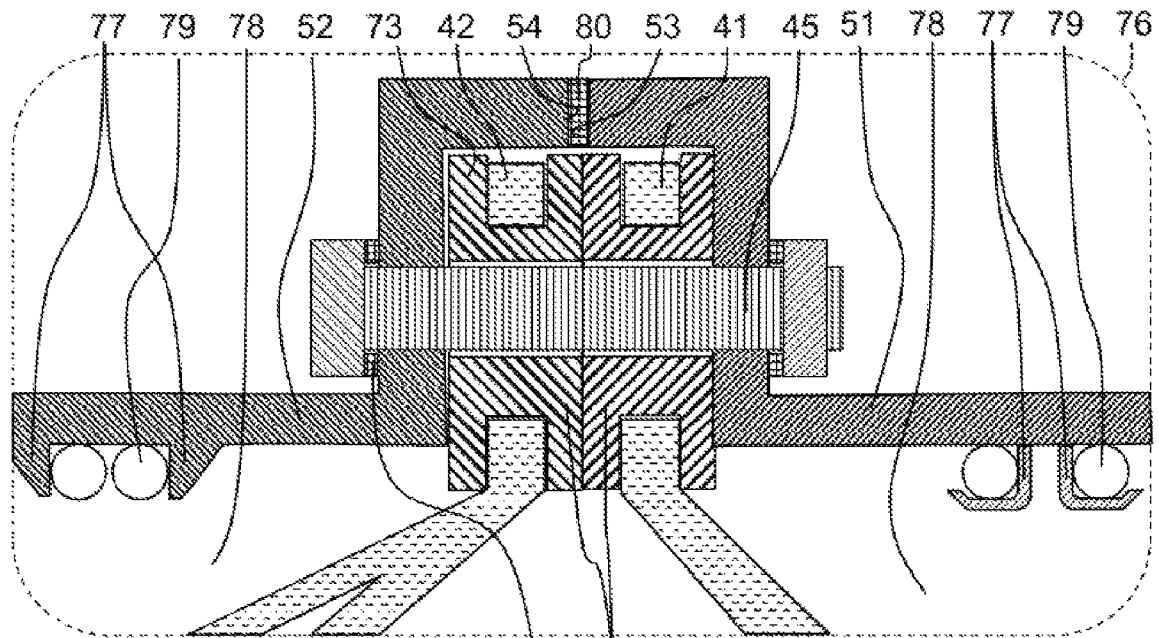
FIG. 19 shows schematically details of an example embodiment of the transmission housing.

FIG. 19 shows schematically a magnification of first area 76 of FIG. 5. According to some example embodiments, at least one of the first and second carbon-fibre skeleton parts 41, 42 and the first and second sealing cover parts 51, 52 may be provided with a fixture arrangement 77, such as a clamp, a holder, a fixture, a channel or guide or the like, located in a space 78 located between the rigid structural framework and the sealing envelope and configured for fixing or guiding a device 79, such as for example a pipe, a hose, an electrically conducting wire, a sensor, an actuator, or the like, installed in said space 78 located between the rigid structural framework and the sealing envelope. By routing or holding a device 79 within said space 78, which is enclosed by the rigid structural framework and the sealing envelope, the device 79 is somewhat better protected from coming into contact with the rotating part of the transmission housing 7 or objects arranged on the outside of the transmission housing 7. Moreover, routing and installation of such devices 79 may be simplified and more cost-efficient.

The schematic magnification of FIG. 19 also illustrated that the carbon-fibre structure, after completed winding around the posts, attachment inserts 48, 58 and/or bearing inserts 60, is configured to fill out the space between the flanges 73 of each attachment insert 48 for the purpose of forming a strong and robust carbon-fibre structure.

FIG. 19 further shows that a first sealing arrangement 80 may be provided between the first and second sealing surfaces 53, 54 of the first and second sealing cover parts 51, 52. This first sealing arrangement 80 may be beneficial for ensuring leak-proof sealing envelope and for reducing noise and vibration.

A second sealing arrangement 81 may according to some example embodiments be provided between the fastener 45 and the first and second sealing cover parts 51, 52 for reducing noise and vibration.

Furthermore, although not showed in FIG. 19, a third sealing arrangement may be provided between each of the first attachment inserts 48 and the first and second sealing cover parts 51, 52 for reducing noise and vibration, and/or a fourth sealing arrangement may be provided between the two abutting first attachment inserts 48 for reducing noise and vibration.

Figure 20:
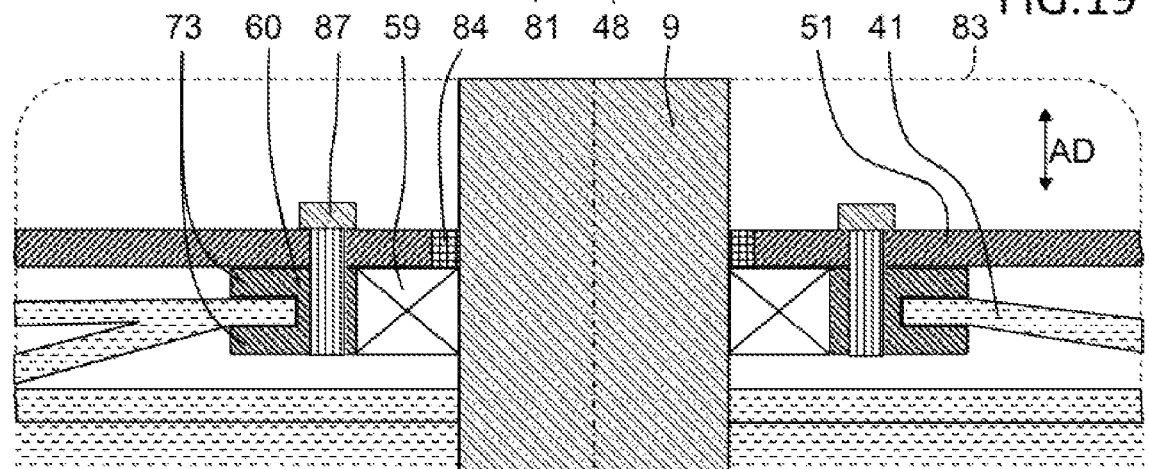
FIGS. 20-21 show schematically two different example embodiments of the bearing insert.

FIG. 20 shows schematically a magnification of a second area 83 of FIG. 5 showing details of the bearing insert 60, etc. More in detail, some of the bearing inserts 60 of the first carbon-fibre skeleton part 41 may be provided with one or more internally threaded holes configured for attaching the first sealing cover part 51 thereto via threaded fasteners 87. An annular sealing arrangement 84 may be provided in the region of the outlet passage of the second transmission shaft 9.

Moreover, FIG. 20 also clearly shows that the bearing insert 60 may have a spool-shaped core region with left and right side flanges 73 for holding and securing the wound carbon-fibre tow to the bearing insert 60.

Figure 21:
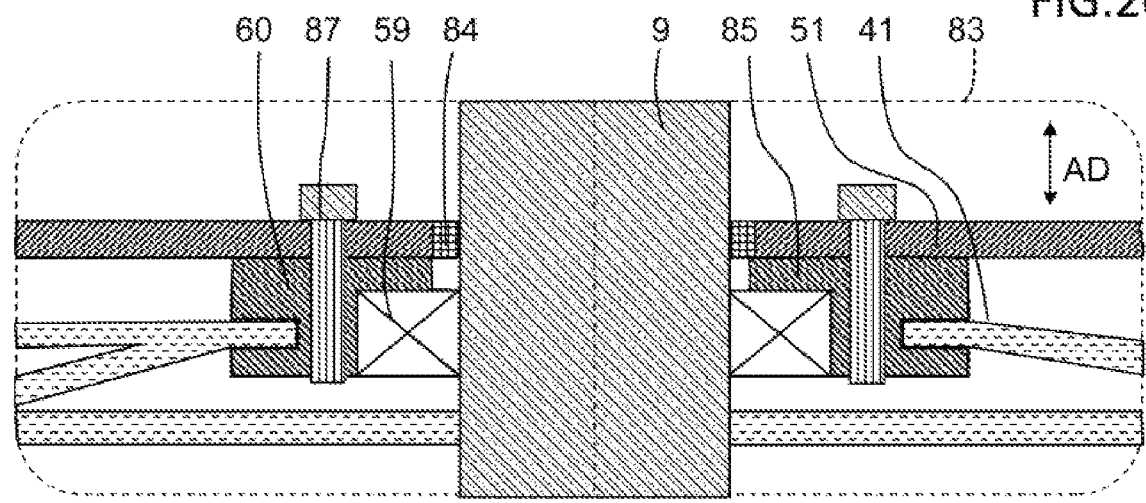

FIG. 21 shows schematically an alternative example embodiment of the bearing insert 60 having an additional flange 85 for improved attachment of the bearing 59 within the bearing insert 60, because the bearing 59 may then be axially supported by additional flange 85 of the bearing insert 60.

Figure 22:
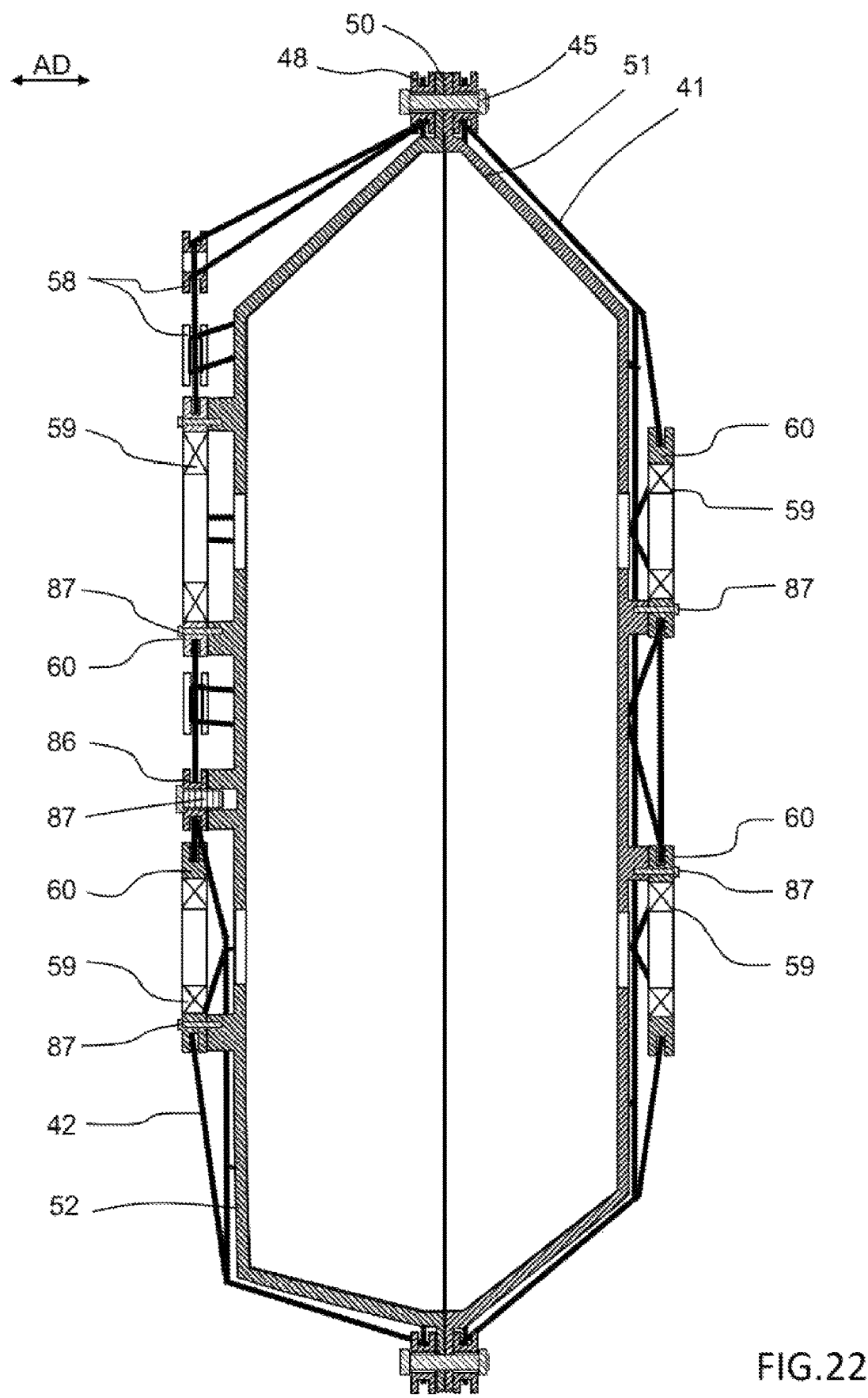

FIG. 22 shows still a further example embodiment of the transmission housing 7 having a sealing envelope made of the first and second sealing cover parts 51, 52 arranged within the first and second carbon-fibre skeleton parts 41, 42. Consequently, the attachment holes 46 provided in the peripheral flange 50 of the first and second sealing cover parts 51, 52 are sandwiched between the attachment holes 47 provided along the periphery of the first and second carbon-fibre skeleton parts 51, 52, and joined by means of common fasteners 45.

The first and second sealing cover parts 51, 52 may be attached to the first and second carbon-fibre skeleton parts 41, 42 also at other locations, in addition to the attachment locations of the peripheral flange 50. For example, the first and second sealing cover parts 51, 52 may be attached to the bearing inserts 60 of the first and second carbon-fibre skeleton parts 41, 42, as illustrated in FIG. 22. Moreover, the first and second carbon-fibre skeleton parts 41, 42 may be provided with dedicated attachment inserts 86 configured for being used for connecting the first and second sealing cover parts 51, 52 to the first and second carbon-fibre skeleton parts 41, 42 by means of a fastener 87.

FIG. 23 shows still a further example embodiment of the composite transmission housing 7, in which the first and second sealing cover parts 51, 52 are arranged on an outer side of the first and second carbon-fibre skeleton parts 41, 42. However, in this example embodiment, the sealing surfaces 53, 54 of the first and second sealing cover parts 51, 52 are not in direct mutual contact with each other, but instead sealingly attached to an exterior surface of the first and second carbon-fibre skeleton parts 41, 42.

In other words, the first and second sealing surfaces 53, 54 of the first and second sealing cover parts 51, 52 are pressed against corresponding sealing surfaces associated with the first and second carbon-fibre skeleton parts 41, 42, for providing a sealing envelope around said internal space.

Consequently, a first sealing arrangement may be provided between the first sealing surface 53 of the first sealing cover part 51 and a corresponding sealing surface associated with the first carbon-fibre skeleton part 41. Similarly, a first sealing arrangement may be provided between the second sealing surface 54 of the second sealing cover part 52 and a corresponding sealing surface associated with the second carbon-fibre skeleton part 42.

This arrangement may be beneficial in certain implementations, for example when each of the first and second carbon-fibre skeleton parts 41, 42 include a metal based first attachment regions 43, 44 for mutually connection, thereby eliminating the need of a completely encapsulated exterior surface of the inner rigid structure.

The basic steps for method for manufacturing the composite transmission housing 7 for a vehicle drive train transmission will be described below with reference to FIG. 24. The method comprises first step S10 of manufacturing a first carbon-fibre skeleton part 41 having a first attachment region 43, a second carbon-fibre skeleton part 42 having a first attachment region 44, a first sealing cover part 51 made of plastic material and having a first sealing surface 53, and a second sealing cover part 52 made of plastic material and having a second sealing surface 54.

When all these parts are made available, the method includes a second step S20 of assembling the first and second carbon-fibre skeleton parts 41, 42 and first and second sealing cover parts 51, 52, such that the first attachment regions 43, 44 of the first and second carbon-fibre skeleton parts 41, 42 become mutually connected and defining a rigid structural framework that defines an internal space 35, and such that the first and second sealing surfaces 53, 54 of the first and second sealing cover parts 51, 52 are pressed together or against corresponding sealing surfaces associated with the first and second carbon-fibre skeleton parts 41, 42, for providing a sealing envelope around said internal space 35.

Clearly, the second step S20 of assembling the first and second carbon-fibre skeleton parts 41, 42 and first and second sealing cover parts 51, 52 may additionally involve mounting of a transmission arrangement within the transmission housing before closing and sealing the housing, wherein the transmission arrangement includes various combinations of transmission shafts and gearwheels, etc.

The first and second carbon-fibre skeleton parts 41, 42 may be manufactured in various ways, and one thereof is described more in detail with reference to FIG. 25. Hence, according to some example embodiments, the first step S10 of manufacturing the first and second carbon-fibre skeleton parts 41, 42 involves a first sub step S13 of providing a first fixture or mould 66 having plurality of posts 70 and/or attachment inserts 48, 58, and providing a second fixture or mould having plurality of posts and/or attachment inserts.

The first step S10 of manufacturing the first and second carbon-fibre skeleton parts 41, 42 furthermore involves a second sub step S17 of winding a continuous filament carbon-fibre tow along a pattern around the plurality of posts 70 and/or attachment inserts 48, 58 of the first fixture 66 or mould for producing a first intermediate part, and winding a continuous filament carbon-fibre tow along a pattern around the plurality of posts or attachment inserts of the second fixture or mould for producing a second intermediate part.

Finally, the first step S10 of manufacturing the first and second carbon-fibre skeleton parts 41, 42 furthermore involves a third sub step S19 of curing the wound continuous filament carbon-fibre tow of the first and second intermediate parts for providing the first and second rigid carbon-fibre skeleton parts 41, 42.

According to some example embodiments, the first step S10 of manufacturing the first and second carbon-fibre skeleton parts involves use of attachment inserts. Hence, a slightly alternative first step S10 of manufacturing the first and second carbon-fibre skeleton parts 41, 42 is described with reference to FIG. 26. Here, the main first step S10 involves a first sub step S13 of providing a first fixture or mould 66 having plurality of posts 70 and providing a second fixture or mould having plurality of posts, and second sub step S14 of mounting a first set of attachment inserts on the first fixture or mould, and mounting a second set of attachment inserts on the second fixture or mould.

Similar to the method steps described with reference to FIG. 25, this approach also involves a subsequent sub step S17 of winding a continuous filament carbon-fibre tow along a pattern around the first set of attachment inserts of the first fixture or mould for producing the first intermediate part, and winding a continuous filament carbon-fibre tow along a pattern around the second set of attachment inserts of the second fixture or mould for producing the second intermediate part, and thereafter a subsequent step S19 of curing the wound continuous filament carbon-fibre tow of the first and second intermediate part, as described above.

Moreover, according to this example embodiment, the second main step S20 of assembling the first and second carbon-fibre skeleton parts 41, 42 involves fastening the first set of attachment inserts 48 with the second set of attachment inserts 48.

In addition, the previously described first sub step S13 of providing a first fixture or mould 66 having plurality of posts 70 and/or attachment inserts 48, 58, and providing a second fixture or mould having plurality of posts and/or attachment inserts may according to some example embodiments include a first further sub step S13a of determining an optimized structural design of a rigid structural framework of the transmission housing by performing a stress and/or strain-based topology optimization of the transmission housing, and thereafter a second further sub step S13b of, based thereupon, selecting a design of the fixture or mould, selecting placement and number of posts and/or attachment inserts on the fixture or mould, and selecting the winding pattern of the continuous filament carbon-fibre tow around the plurality of posts or attachment inserts of the fixture or mould that results in a structure, in particular in terms of size, shape and/or topology, of the rigid structural framework that corresponds to the determined optimized structural design.

In addition, according to some example embodiments, a further alternative method for manufacturing the transmission housing is described below and with reference to FIG. 28, wherein the first step S10 involves a first sub step S13 of providing a first fixture or mould 66 having plurality of posts 70 and providing a second fixture or mould having plurality of posts, and further sub step S15 of mounting at least one bearing insert 60 on at least one of the first and second fixtures or moulds, and a subsequent sub step S18 of winding a continuous filament carbon-fibre tow along a pattern around the at least one bearing insert 60 for producing the first and/or second intermediate part. Thereafter, the method includes a subsequent sub step S19 of curing the wound continuous filament carbon-fibre tow of the first and second intermediate part, as described above. Moreover, according to this example embodiment, the second main step S20 of assembling the first and second carbon-fibre skeleton parts 41, 42 involves installing a bearing 59 for supporting a transmission shaft in the bearing insert 60.

The methods described with reference to FIGS. 26 and 28 may also be combined, meaning that both attachment inserts and one or more bearing inserts are mounted. Such a method is schematically described with reference to FIG. 29, wherein the first step S10 involves a first sub step S13 of providing a first fixture or mould 66 having plurality of posts 70 and providing a second fixture or mould having plurality of posts, a further sub step S14* of mounting a first set of attachment inserts on the first fixture or mould and mounting a second set of attachment inserts on the second fixture or mould, and mounting at least one bearing insert 60 on at least one of the first and second fixtures or moulds.

The main first step S10 further involves a subsequent sub step S17* of winding the continuous filament carbon-fibre tow along a pattern around the first set of attachment inserts of the first fixture or mould, and winding a continuous filament carbon-fibre tow along a pattern around the second set of attachment inserts of the second fixture or mould, and winding a continuous filament carbon-fibre tow along a pattern around the at least one bearing insert 60 for producing the first and second intermediate parts.

Thereafter, the method includes a subsequent sub step S19 of curing the wound continuous filament carbon-fibre tow of the first and second intermediate part, as described above. Moreover, according to this example embodiment, the second main step S20 of assembling the first and second carbon-fibre skeleton parts 41, 42 involves installing a bearing 59 for supporting a transmission shaft in the bearing insert 60 and fastening the first set of attachment inserts 48 with the second set of attachment inserts 48.

Moreover, according to some example embodiment, the second main step S20 of assembling the first and second carbon-fibre skeleton parts 41, 42 include mounting a set of common fasteners 45, each of which extends through and presses together the first and second carbon-fibre skeleton parts 41, 42 and the first and second sealing cover parts 51, 52, for mutually connecting the first and second carbon-fibre skeleton parts and for providing a sealing envelope around said internal space by means of the first and second sealing cover parts 51, 52.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Although discussed above as methods described by the flowcharts of FIG. 24-29, it should be appreciated that one or more operations may be performed in another order then explicitly described, within the scope of the appended claims and the concept of the method as described herein, and do not necessarily imply being restricted to the order as explicitly provided. For example, the methods steps discussed with reference to FIG. 27 may implemented also in the methods described with reference to any of FIG. 25, 25, 28 or 29. Hence, the methods discussed are merely one embodiment of the present disclosure as contemplated and individual steps may be combined with other steps although not explicitly described.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A composite transmission housing for a vehicle drive train transmission, the transmission housing is configured for sealingly enclosing a set of transmission shafts and gearwheels and a lubricant fluid within an internal space of the housing and comprises:
    a first carbon-fibre skeleton part having a first attachment region,
    a second carbon-fibre skeleton part having a first attachment region,
    a first sealing cover part made of plastic material and having a first sealing surface, and
    a second sealing cover part made of plastic material and having a second sealing surface,
    wherein the first attachment regions of the first and second carbon-fibre skeleton parts are mutually connected for providing a rigid structural framework that defines said internal space, and
    wherein the first and second sealing surfaces of the first and second sealing cover parts are pressed together or against corresponding sealing surfaces associated with the first and second carbon-fibre skeleton parts, for providing a sealing envelope around said internal space.

2. The composite transmission housing according to claim 1, wherein each of the first and second carbon-fibre skeleton parts is manufactured by winding a continuous filament carbon-fibre tow along a pattern around a plurality of posts or attachment inserts of a fixture or mould, and subsequently curing the wound continuous filament carbon-fibre tow.

3. The composite transmission housing according to claim 2, wherein the position of the plurality of posts or attachment inserts of the fixture or mould and the winding pattern of the continuous filament carbon-fibre tow are selected based on stress and/or strain based topology optimization or generative design of the transmission housing.

4. The composite transmission housing according to claim 1, wherein the first skeleton part has a first set of attachment inserts secured thereto in the first attachment region by means of continuous filament carbon-fibre being wound thereon, wherein the second skeleton part has a second set of attachment inserts secured thereto in the first attachment region by means of continuous filament carbon-fibre being wound thereon, and wherein the first and second carbon-fibre skeleton parts are mutually connected by fastening the first set of attachment inserts with the second set of attachment inserts.

5. The composite transmission housing according to claim 1, wherein at least one of the first and second carbon-fibre skeleton parts has a bearing insert secured thereto by means of continuous filament carbon-fibre being wound thereon, and wherein a bearing supporting a transmission shaft is fastened within the bearing insert.

6. The composite transmission housing according to claim 1, wherein an attachment insert and/or a bearing insert of the first and second carbon-fibre skeleton parts is provided with an internally threaded bore for attaching a sealing cover part thereto.

7. The composite transmission housing according to claim 1, wherein at least one of first and second carbon-fibre skeleton parts and the first and second sealing cover parts is provided with a fixture arrangement located in a space located between the rigid structural framework and the sealing envelope and configured for fixing or guiding a device installed in said space located between the rigid structural framework and the sealing envelope.

8. The composite transmission housing according to claim 1, wherein the first and second carbon-fibre skeleton parts and the first and second sealing cover parts are joined together by a set of common fasteners, each of which extends through and presses together all said parts.

9. The composite transmission housing according to claim 1, wherein
    the first and second sealing cover parts are separate parts that are attached to first and second carbon-fibre skeleton parts, respectively, upon assembly of the composite transmission housing, or
    the first and second sealing cover parts are overmoulded on an exterior or interior side of the first and second carbon-fibre skeleton parts, respectively.

10. The composite transmission housing according to claim 6, wherein the attachment insert and/or bearing insert has a spool-shape.

11. The composite transmission housing according to claim 1, wherein the first and second sealing cover parts are made of a thermoset plastic material.

12. A method for manufacturing a composite transmission housing for a vehicle drive train transmission, wherein the transmission housing is configured for sealingly enclosing a set of transmission shafts and gearwheels and a lubricant fluid within an internal space of the housing, the method comprising:
    manufacturing a first carbon-fibre skeleton part having a first attachment region, a second carbon-fibre skeleton part having a first attachment region, a first sealing cover part made of plastic material and having a first sealing surface, and a second sealing cover part made of plastic material and having a second sealing surface,
    assembling the first and second carbon-fibre skeleton parts and first and second sealing cover parts, such that the first attachment regions of the first and second carbon-fibre skeleton parts become mutually connected and defining a rigid structural framework that defines said internal space, and such that the first and second sealing surfaces of the first and second sealing cover parts are pressed together or against corresponding sealing surfaces associated with the first and second carbon-fibre skeleton parts, for providing a sealing envelope around said internal space.

13. The method for manufacturing a composite transmission housing according to claim 12, wherein the step of manufacturing the first and second carbon-fibre skeleton parts involves:
providing a first fixture or mould having plurality of posts or attachment inserts, and providing a second fixture or mould having plurality of posts or attachment inserts,
winding a continuous filament carbon-fibre tow along a pattern around the plurality of posts or attachment inserts of the first fixture or mould for producing a first intermediate part, and winding a continuous filament carbon-fibre tow along a pattern around the plurality of posts or attachment inserts of the second fixture or mould for producing a second intermediate part, and
curing the wound continuous filament carbon-fibre tow of the first and second intermediate parts for providing the first and second rigid carbon-fibre skeleton parts.

14. The method for manufacturing a composite transmission housing according to claim 13, wherein the step of manufacturing each of the first and second carbon-fibre skeleton parts involves:
mounting a first set of attachment inserts on the first fixture or mould, and mounting a second set of attachment inserts on the second fixture or mould, and
winding a continuous filament carbon-fibre tow along a pattern around the first set of attachment inserts of the first fixture or mould for producing the first intermediate part, and winding a continuous filament carbon-fibre tow along a pattern around the second set of attachment inserts of the second fixture or mould for producing the second intermediate part,
curing the wound continuous filament carbon-fibre tow of the first and second intermediate parts for providing the first and second rigid carbon-fibre skeleton parts, and
assembling the first and second carbon-fibre skeleton parts by fastening the first set of attachment inserts with the second set of attachment inserts.

15. The method for manufacturing a composite transmission housing according to claim 13, further comprising:
determining an optimized structural design of a rigid structural framework of the transmission housing by performing a stress and/or strain-based topology optimization or generative design of the transmission housing, and
based thereupon, selecting a design of the first and second fixtures or moulds, selecting placement and number of said posts and/or attachment inserts on the first and second fixtures or moulds, and selecting the winding pattern of the continuous filament carbon-fibre tow around the plurality of posts or attachment inserts of the first and second fixtures or moulds that results in a structure in terms of size, shape and/or topology of the rigid structural framework that corresponds to the determined optimized structural design.

* * * * *